(12) United States Patent
Johnson et al.

(10) Patent No.: US 7,397,916 B2
(45) Date of Patent: Jul. 8, 2008

(54) SYSTEM AND METHOD FOR PROTECTING COMPUTER SOFTWARE FROM A WHITE BOX ATTACK

(75) Inventors: Harold J. Johnson, Nepean (CA); Stanley T. Chow, Nepean (CA); Philip A. Eisen, Nepean (CA)

(73) Assignee: Cloakware Corporation, Ottawa, Ontario (CA)

( * ) Notice: Subject to any disclaimer, the term of this patent is extended or adjusted under 35 U.S.C. 154(b) by 718 days.

(21) Appl. No.: 10/433,966

(22) PCT Filed: Dec. 10, 2001

(86) PCT No.: PCT/CA01/01729

§ 371 (c)(1),
(2), (4) Date: Feb. 18, 2004

(87) PCT Pub. No.: WO02/46890

PCT Pub. Date: Jun. 13, 2002

(65) Prior Publication Data

US 2004/0139340 A1      Jul. 15, 2004

(30) Foreign Application Priority Data

Dec. 8, 2000   (CA) .................................. 2327911

(51) Int. Cl.
*H04K 1/00* (2006.01)
*H04L 9/00* (2006.01)
*H04L 9/28* (2006.01)
*G06F 11/30* (2006.01)
*G06F 12/14* (2006.01)
*H04L 9/32* (2006.01)

(52) U.S. Cl. .......................... 380/28; 713/194; 713/190
(58) Field of Classification Search ................... 380/28; 713/194, 190
See application file for complete search history.

(56) References Cited

U.S. PATENT DOCUMENTS 5,892,899 A * 4/1999 Aucsmith et al. ............. 726/27

(Continued)

FOREIGN PATENT DOCUMENTS

EP         981223 A2 * 2/2000

OTHER PUBLICATIONS

Chow, S. et al. "A White-Box DES Implementation for DRM Applications", Oct. 15, 2002.*

(Continued)

*Primary Examiner*—Kambiz Zand
*Assistant Examiner*—Michael J. Simitoski
(74) *Attorney, Agent, or Firm*—Jeffrey M. Measures; Borden Ladner Gervais LLP

(57) ABSTRACT

Existing encryption systems are designed to protect secret keys or other data under a "black box attack," where the attacker may examine the algorithm, and various inputs and outputs, but has no visibility into the execution of the algotitm itself. However, it has been shown that the black box model is generally unrealistic, and that attack efficiency rises dramatically if the attacker can observe even minor aspects of the algorithm's execution. The invention protects software from a "white-box attack", where the attacker has total visibility into software implementation and execution. In general, this is done by encoding the software and widely diffusing sites of information transfer and/or combination and/or loss. Other embodiments of the invention include: the introduction of lossy subcomponents, processing inputs and outputs with random cryptographic functions, and representing algorithmic steps or components as tables, which permits encoding to be represented with arbitrary nonlinear bijections.

12 Claims, 15 Drawing Sheets

U.S. PATENT DOCUMENTS

| | | | |
|---|---|---|---|
| 6,668,325 B1 * | 12/2003 | Collberg et al. | 713/194 |
| 7,073,072 B1 * | 7/2006 | Salle | 713/193 |
| 7,162,031 B1 * | 1/2007 | Roelofsen et al. | 380/28 |
| 2002/0016918 A1 * | 2/2002 | Tucker et al. | 713/190 |

OTHER PUBLICATIONS

Coron, Jean-Sebastien. "Resistance Against Differential Power Analysis for Elliptic Curve Cryptosystems", 1999.*

Coron, Jean-Sebastien et al. "On Boolean and Arithmetic Masking against Differential Power Analysis", 2000.*

Daemen, Joan et al. "Bitslice Ciphers and Power Analysis Attacks", 2000.*

Daemen, Joan et al. "Efficient Block Ciphers for Smartcards", May 1999.*

Goubin, Louis et al. "DES and Differential Power Analysis, The "Duplication" Method", Aug. 1999.*

* cited by examiner

FIGURE 3: Outer Structure of DES

FIGURE 4: Structure of One DES Round

SYSTEM AND METHOD FOR PROTECTING COMPUTER SOFTWARE FROM A WHITE BOX ATTACK

RELATED APPLICATIONS

This application claims the priority of Canadian Patent Application Serial No. 2,327,911, filed Dec. 8, 2000; and PCT Application Ser. No. PCT/CA01/01729, filed Dec. 10, 2001, which are incorporated herein by reference.

The present invention relates generally to computer software and electronic hardware, and more specifically, to a method, apparatus and system resistant to a "white box attack"; that is, a system which will protect certain information from discovery even when the attacker has total visibility into software implementation and execution.

BACKGROUND OF THE INVENTION

The use of computers and computer software in all of their various forms is recognized to be very common and is growing everyday. In industrialized nations, hardly a business exists that does not rely on computers and software either directly or indirectly, in their daily operations. As well, with the expansion of powerful communication networks such as the Internet, the ease with which computer software programs and data files may be accessed, exchanged, copied and distributed is also growing daily.

In order to take advantage of these computer and communication systems and the efficiencies that they offer, there is a need for methods of storing and exchanging computer software and information securely. Information security issues can generally be categorized as one of the following:

A) confidentiality or privacy, where the goal is to prevent information from being obtained and understood by others;

B) data integrity, where the goal is either to prevent the alteration of data or to advise an authorized party that a set of data has been tampered with;

C) authentication, where the goal is to affirm the identity of a party; or

D) non-repudiation, where the goal is to prevent a party from denying that they made a certain communication. Non-repudiation is often used in electronic commerce transactions, particularly in bidding and negotiation environments.

One method of maintaining confidentiality or privacy that has demonstrated widespread use and acceptance is encryption of data using secret cryptographic keys. Such methods are generally accepted as secure, as an attacker must perform an impractically large number of mathematical tests to identify the cryptographic key required to decode a given encrypted data file. Cracking the Data Encryption Standard (DES) for example, would require an average of $2^{55}$ different keys to be tested, requiring more than 1 thousand years of testing at a rate of one million key tests per second. DES is just one of several block cipher methods which are very fast and are widely used—block ciphers are schemes in which data is divided up into blocks which are encrypted and decrypted separately from one another. If the cryptographic key is kept secure, it offers very good security.

There are many applications, however, in which the encryption key or other secret information (such as biometric data) must be hidden in application software itself. One such example is a Smart Card. Smart Cards are credit card-sized devices which have a small amount of electronic memory and a small microprocessor. They are often used in electronic commerce applications or to record personal information such as health records.

Existing encryption systems are designed to protect their secret keys or other secret data against a "black box attack". This is a situation where the attacker has knowledge of the algorithm and may examine various inputs to and outputs from the algorithm, but has no visibility into the execution of the algorithm itself. Typical black box attacks are categorized as follows:

A) ciphertext-only attacks, where the attacker attempts to deduce the secret key or plaintext by analysing only the ciphertext;

B) known-plaintext attacks, where the attacker has sets of plaintext and corresponding ciphertext which he can analyse;

C) chosen-plaintext attacks where the attacker can execute the targeted algorithm on plaintext he has chosen, and compare it to the corresponding ciphertext; and D) adaptive chosen-plaintext attacks, where the attacker modifies the plaintexts he selects for encryption, based on the results of previous analyses.

While such attacks are powerful enough by themselves, it has been shown that the black box model does not reflect reality. Often, if the attacker has sufficient access to the targeted algorithm to mount an adaptive chosen-plaintext attack, he is also in a position to observe at least some aspect of the execution of the algorithm itself.

For example, in their paper on Differential Power Analysis (DPA) titled: *Introduction to differential power analysis and related attacks*, 1998 (available on the Internet at http://www.cryptography.com/dpa/technical), Paul Kocher, Joshua Jaffe and Benjamin Jun demonstrated that Smart Cards protected with DES could be cracked in a matter of minutes rather than the theoretical thousand years of testing. DPA merely monitors the power consumed by the Smart Card while it is executing the DES algorithm on a chosen input. The power-consumed by the Smart Card at any given point in time corresponds with the bias state of the transistors in the device. The DPA attack can thus deduce the number of bits that are correct in a proposed key by statistical analysis, converging to the correct key very quickly.

The DPA attack shows that having very limited access to the execution of an algorithm designed to defend against a black box attack, is sufficient to make that algorithm completely insecure. Therefore, encryption algorithms must be designed to be secure against a much more powerful attack model—the "white box attack". A white box attack is simply an attack on a software algorithm in which the attacker has full visibility into the execution of the algorithm (note that the DPA attack may be characterised as a "grey box attack" because the attacker is only able to observe a small part of the execution).

Unfortunately, existing encryption and decryption algorithms and related algorithms including those for digital signatures, password authentication, Smart Cards and the like, are not resistant to white box attacks. In fact, many believe it is impossible to achieve such protection.

Several approaches have been suggested, but offer very weak protection. For example:

A) existing general-purpose commercial software obfuscators use a variety of techniques including: removal of debugging information, changing variable names, introducing irreducible flow graphs, and particularly in the case of Java, modifying code structures to avoid stereotyped forms for source control structures. These methods produce superficial changes, but the information exposed by deeper analyses employed by optimizing compilers and similar sophisticated tools is changed very little. The data flow and control flow information exposed by such analyses is either not affected at all, or is only slightly affected, by the above methods of obfuscation;

B) attempts have also been made to hide the real code by introducing dummy code, for example, by making every other statement a dummy statement designed to look much like the real code. Along with the higher overhead created, this approach has two fatal weaknesses:
   i) it is vulnerable to data flow analysis (DFA) to discover the dummy code; and
   ii) even if DFA can be rendered ineffective, if x% of the code is dummy code, then 100-x% of the code is significant. For realistic values of x, a patient attacker can locate which statements matter and which do not, by trial and error; and C) U.S. Pat. No. 5,892,899 titled "Tamper Resistant Methods and Apparatus", issuing to Aucsmith et al. makes two suggestions:
   i) splitting the cryptographic key into pieces stored in different locations in the software code, and
   ii) encoding a program in separate sections, decoding only those sections needed, when they are to be executed.
   Neither of these approaches is effective as the software code always executes in an unprotected form. Careful tracing of the execution therefore allows the pieces to be reassembled, yielding the complete and unprotected program.

As well, in their patent application serial no. PCT/US98/12017, Christian Collberg, Clark Thomborsson and Douglas Crow present slightly more sophisticated variations on these themes. While these techniques might sufficiently obscure a key (for example) against a generic, automated attack, they are not resistant to a rigorous white box attack. In most cases, simply tracing execution of the software code will reveal the encryption key and any secure data completely.

Collberg et al, for example, suggest making some simple linear transformations to data values. A careful tracing of the program execution will identify how these transformations are done and undone. As well, since these transformations are linear, they can be reduced.

In addition, a variety of cryptographically weak approaches have been used for encryption and decryption, which avoid the use of any explicit key whatever. These methods are vulnerable either to a cryptographic black-box attack if plain-text can be recognized in an automated way, or to algorithmic analysis with the aid of debugging tools, since the would-be encryption is then a data transformation of quite limited algorithmic complexity.

In general, then, the state of the art has been that programs could not be made effectively secret-hiding and tamper-resistant. In particular, cryptographic keys for reasonably secure ciphers could not be securely hidden in software.

There is therefore a need for a method, apparatus and system for encryption that is tamper-resistant, allowing secret cryptographic keys, biometric data and encrypted data to have software operations executed upon it, without fear that security will be breached.

SUMMARY OF THE INVENTION

It is therefore an object of the invention to provide a method and system that improves upon the problems described above.

One aspect of the invention is broadly defined as a method of modifying software algorithms to foil tracing and other static, dynamic, and statistical attacks comprising the steps of: encoding the software algorithm; and widely diffusing sites of information transfer and/or combination and/or loss.

Another aspect of the invention is defined as a method of protecting computer software comprising the steps of: identifying functions and transforms substantive to the targeted software program; generating new functions and transforms which alter the processing activity visible to the attacker; and replacing those identified functions and transforms with the new functions and transforms in the software program.

Another aspect of the invention is defined as an apparatus for modifying software algorithms to foil tracing and other static, dynamic, and statistical attacks comprising means for encoding the software algorithm; and means for widely diffusing sites of information transfer and/or combination and/or loss.

A further aspect of the invention is defined as a computer readable memory medium, storing computer software code executable to perform the steps of: encoding the software algorithm; and widely diffusing sites of information transfer and/or combination and/or loss.

An additional aspect of the invention is defined as a computer data signal embodied in a carrier wave, the computer data signal comprising a set of machine executable code being executable by a computer to perform the steps of: encoding a software algorithm; and widely diffusing sites of information transfer and/or combination and/or loss.

BRIEF DESCRIPTION OF THE DRAWINGS

These and other features of the invention will become more apparent from the following description in which reference is made to the appended drawings in which.

GENERAL DESCRIPTION OF THE INVENTION

As noted above, most security software is designed under the assumption that the software will be applied in a secure environment, that is, in a black-box model. This of course, is not realistic, and as a result, most security software cannot withstand a concerted attack.

The central failing of black-box security models is that the specific implementation of the software algorithm is considered to be irrelevant to security. This is in direct contrast to the method of the invention. The invention appreciates that in the case of a white-box model, the algorithm is critical, and changing the specific implementation of the algorithm is the primary means for providing security.

The invention provides ways to make finding an embedded cryptographic key or other hidden information combinatorially difficult for the attacker, even under this severe threat model. Such methods are inherently bulkier and slower than black-box cryptography, but there are many applications in which the tradeoff is well worthwhile, including, for example, Smart Card and their hardware alternatives.

Figure 1:
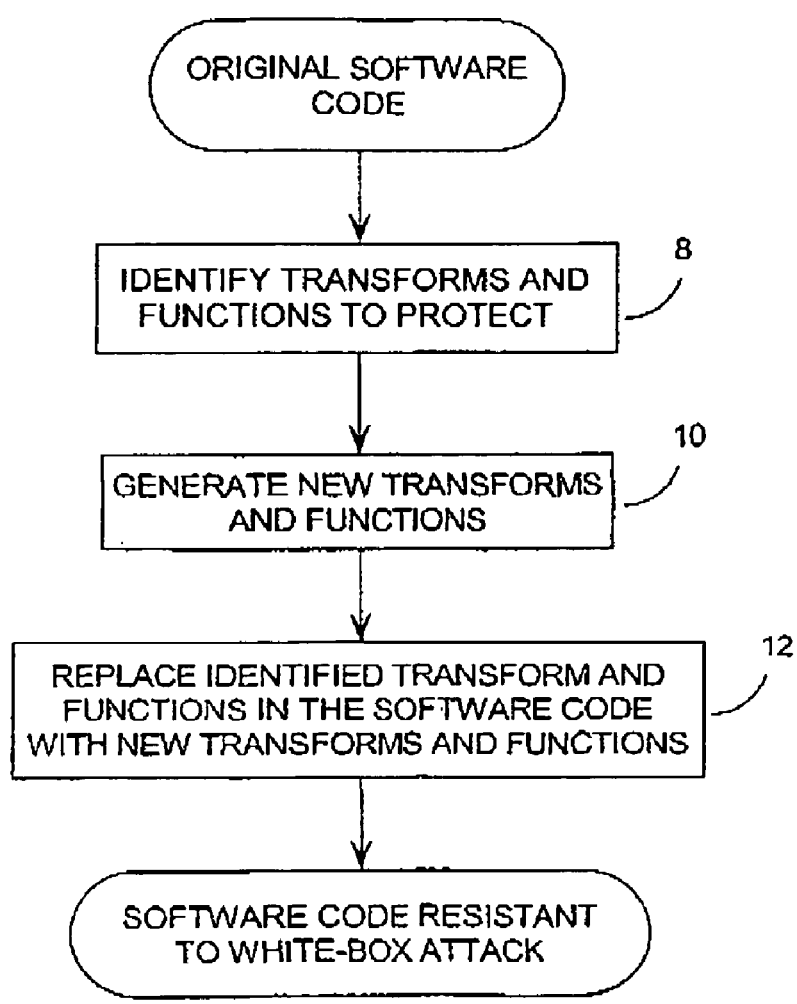
FIG. 1 presents a flow chart of a general algorithm for implementation of the invention.

In broad terms, the method of the invention which addresses the objects outlined above, is presented as a flow chart in FIG. 1. This figure presents a method of increasing the obscurity and tamper-resistance of a software program by:
A) identifying functions and transforms substantive to the targeted software program at step 8;
B) generating new functions and transforms which alter the processing activity visible to the attacker at step 10; and
C) replacing those identified functions and transforms with the new functions and transforms in the software program at step 12.

A number of different techniques for effecting the invention are described hereinafter. These techniques may be grouped generally as follows:
A) making transforms non-linear, so they cannot be reduced by an attacker,
B) making processing activity disappear, by generating new transforms that eliminate data (like constants, etc.) and processing steps (such as combining two transforms together into one);
C) generating new, spurious, processing activity, by concatenating random transforms to real ones, and performing input and output encodings that introduce processing activity completely unrelated to the original data; and
D) encoding and widely diffusing sites of information transfer and/or combination and/or loss.

Hence, the invention can be employed to protect any manner of software from being analysed, reversed-engineered, or simply observed to discover secure data such as cryptographic keys. Cryptographic keys can then be incorporated into software programs without the danger of the cryptographic key being disclosed, or the program being altered to do anything other than what it was originally intended to do. Executable music files, for example, can be bound to a particular processing device or to a password, and attackers are unable to modify the code to allow it to be used by others or on other devices.

Similarly, passwords, biometric data and other secure programs and data files can also be securely stored, transferred and executed using the method of the invention.

Being a software solution, the cost of the invention is very small and the invention can be transported electronically. The invention has none of the costly administrative and physical limitations of hardware solutions. The degree of complexity of the invention is easily scalable, so that the degree of analysis required to overcome it can be made impractically great.

Figure 2:
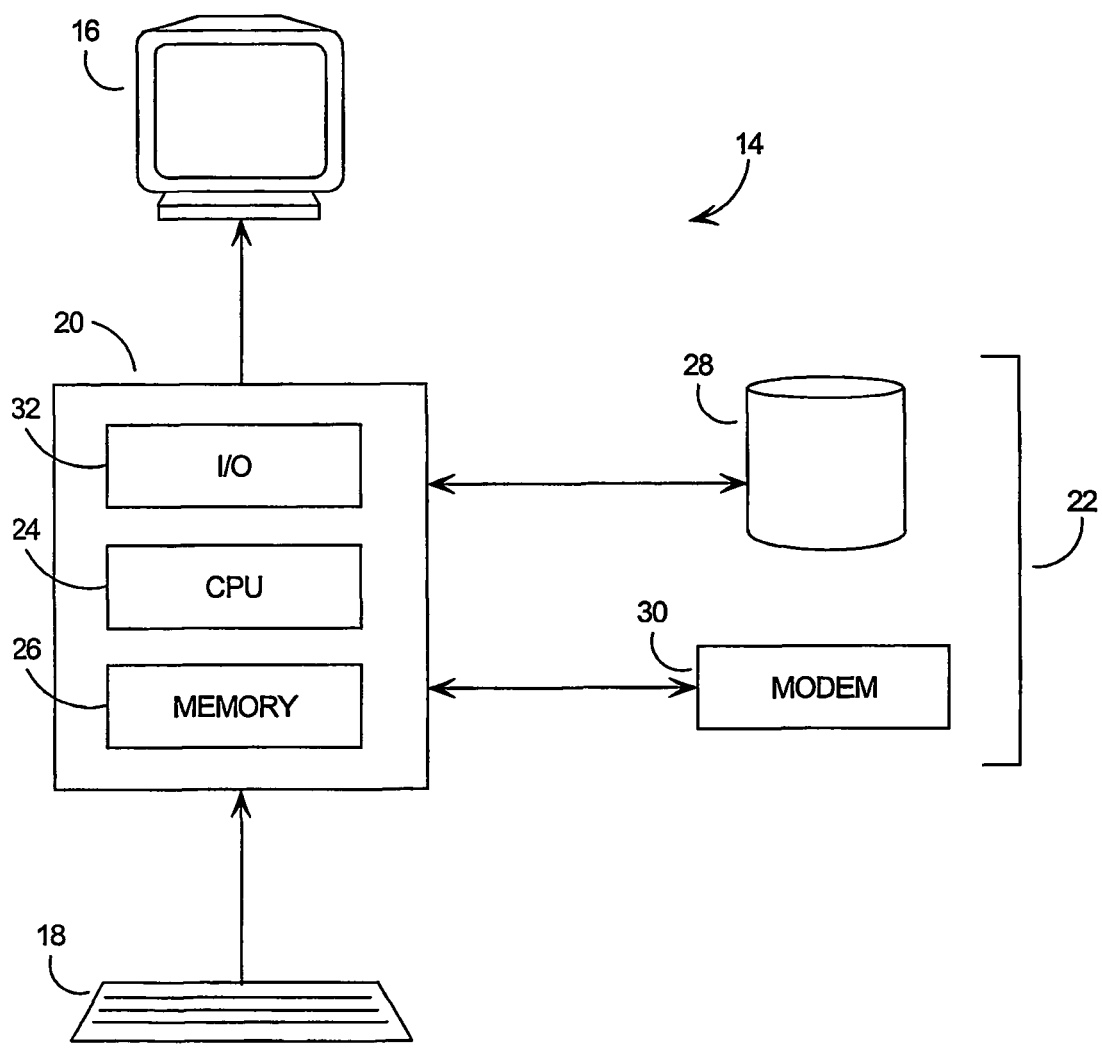
FIG. 2 presents an exemplary computer system in which the invention may be embodied.

An example of a system upon which the invention may be performed is presented as a block diagram in FIG. 2. This computer system 14 includes a display 16, keyboard 18, computer 20 and external devices 22.

The computer 20 may contain one or more processors or microprocessors, such as a central processing unit (CPU) 24. The CPU 24 performs arithmetic calculations and control functions to execute software stored in an internal memory 26, preferably random access memory (RAM) and/or read only memory (ROM), and possibly additional memory 28. The additional memory 28 may include, for example, mass memory storage, hard disk drives, floppy disk drives, magnetic tape drives, compact disk drives, program cartridges and cartridge interfaces such as those found in video game devices, removable memory chips such as EPROM or PROM, or similar storage media as known in the art. This additional memory 28 may be physically internal to the computer 20, or external as shown in FIG. 2.

The computer system 14 may also include other similar means for allowing computer programs or other instructions to be loaded. Such means can include, for example, a communications interface 30 which allows software and data to be transferred between the computer system 14 and external systems. Examples of communications interface 30 can include a modem, a network interface such as an Ethernet card, a serial or parallel communications port. Software and data transferred via communications interface 30 are in the form of signals which can be electronic, electromagnetic, optical or other signals capable of being received by communications interface 30.

Input and output to and from the computer 20 is administered by the input/output (I/O) interface 32. This I/O interface 32 administers control of the display 16, keyboard 18, external devices 22 and other such components of the computer system 14.

The invention is described in these terms for convenience purposes only. It would be clear to one skilled in the art that the invention may be applied to other computer or control systems 14. Such systems would include all manner of appliances having computer or processor control including telephones, cellular telephones, televisions, television set top units, point of sale computers, automatic banking machines, lap top computers, servers, personal digital assistants, Smart Cards and automobiles.

The invention will now be described with respect to the particular application of the Data Encryption Standard (DES) encryption and decryption.

Description of DES

The Data Encryption Standard (DES) is a block cipher, where data being encoded or decoded is broken down into sixty-four-bit blocks which are operated upon separately. DES inputs a sixty-four-bit block to be encrypted or decrypted and a sixty-four-bit raw key and outputs a sixty-four-bit result. Only fifty-six bits of the raw key are actually used: the low-order bit of each raw key 8-bit byte is discarded, or can be used for parity.

DES will only be described herein with sufficient detail to explain the invention. A more detailed description of (single) DES is provided in FIPS (Federal Information Processing Standards in the United States) publication 46-3. A description and an extensive discussion are also provided by Bruce Schneier, *Applied Cryptography*, ISBN 0471-11709-9, John Wiley and Sons, 1996, DES receiving particular attention on pp. 265-294.

There are only three kinds of data operations in DES:

A) selecting some or all bits from a bit-string and reordering them into a new bit-string, possibly with multiple appearances of certain bits. Schneier et al. refer to these as permutations, though this is not quite accurate since they are not necessarily bijections. Therefore, such transformations will referred to herein as quasi-permutations (QPMs), with the true permutations being the special case of a QPM being a bijection.

(Note that a bijection is a function which is both one-to-one and onto. A function is one-to-one if each element in the set of outputs is the image of only one element in the set of inputs; also referred as an injection. A function is onto if each element in the set of outputs is the image of at least one element in the set of inputs.)

Each QPM operation is controlled by a table which for each to-bit of the output bit-string gives the from-bit in the input bit-string whose value it has, except for key-shift QPMs, which are simple rotation permutations, each of which is described by a simple signed shift count;

B) Boolean bit-wise exclusive or (XOR) operations; and

C) looking up elements in a table (LKP). In DES, before performing any transformations, these are look-ups in sixty-four-element tables of 4-bit-strings (each table is called an S-box—S for "substitution"), using a 6-bit-string as an index. Initially, each LKP operation is controlled by one of eight S-box tables indicating the substitutions it is to perform.

Figure 3:
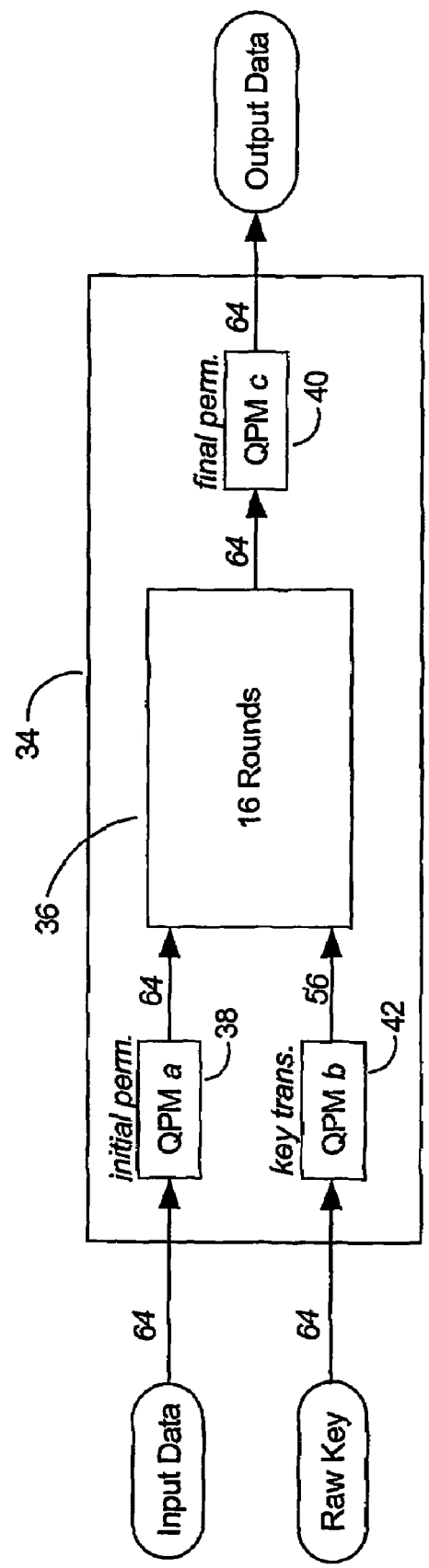
FIG. 3 presents a data flow diagram of the outer structure of the DES algorithm.

FIG. 3 presents a data flow diagram of the outer structure of DES. This presentation is intended to emphasize the three basic kinds of operations making up DES, as described above. Italicized numbers adjacent to the arrows indicate the bit-widths of the indicated values. The outer box 34 represents the entire DES algorithm, whether encryption or decryption. The inner structure of DES comprises sixteen rounds of processing 36, which are identical except for one minor variation in the final round and the variations in one of the internal QPM operations, namely, the key shift, QPMe, which is explained hereinafter. The initial permutation, QPMa at step 38, and the final permutation, QPMc at step 40, are true permutations, that is, there are no omissions and no duplicated bits. Note that QPMc at step 40 is the inverse of QPMa at step 38. The key transformation, QPMb at step 42, selects fifty-six of sixty-four bits from the raw key, and rearranges the bits.

Figure 4:
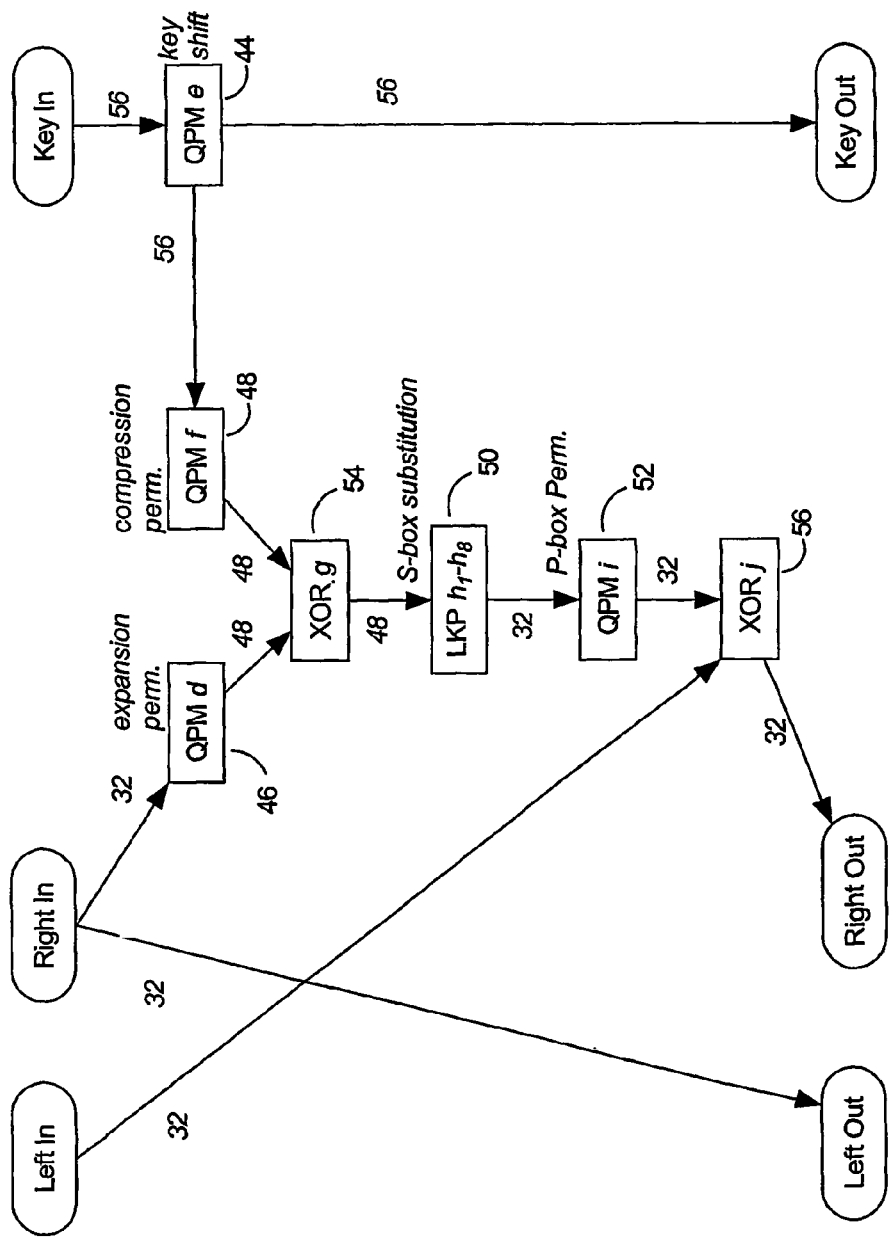
FIG. 4 presents a data flow diagram of a single round of the DES algorithm.

FIG. 4 presents a data flow diagram of the internal structure of one of the sixteen DES rounds at step 36. Left In and Right In are the left and right halves of the data being encrypted or decrypted as it enters the round, and Left Out and Right Out are these halves after the processing has been performed by the rounds. Key In is the fifty-six-bit key as it enters the round, and Key Out is the fifty-six-bit key as it leaves the round. The expansion permutation, QPMd at step 46, repeats certain bits, whereas the compression permutation, QPMf at step 48, which produces the round sub-key as its output, omits certain bits.

The key shift, QPMe at step 44, consists of rotations of the left and right halves of the fifty-six-bit key by an identical amount, in a direction and with a number of shift positions determined by the round number and by whether encryption or decryption is being performed. LKP h1-h8 at step 50 (performing S-box substitution) are the eight S-box lookup tables performed in the round. In the DES standard, the indices for the LKP operations h1-h8 at step 50 are each, in effect, preceded by yet another QPM operation, which permutes the six input bits so that the low-order or right-most bit becomes the bit second from the left in the effective index, but this QPM can be eliminated to match what has been shown above by reordering the elements of the S-box tables. The P-box permutation, QPMi at step 52, permutes the results of LKP h1-h8 at step 50, presumably to accelerate diffusion of information across all bits.

The XORg operation at step 54 is a simple Boolean exclusive OR on the outputs of the QPMd at step 46 and the output from the QPMf at step 48. Similarly, the XORj operation at step 56 is a simple Boolean exclusive OR on the outputs of the Left In and the output from QPMi at step 52.

Note that all rounds are performed identically except for the previously mentioned differences in the key shift, QPMe, and the swapping of Left Out and Right Out, relative to what is shown in FIG. 3, in the final round.

DETAILED DESCRIPTION OF THE PREFERRED EMBODIMENTS OF THE INVENTION

1.0 Introduction

As noted above, the embodiments of the invention are intended to protect software and data from a white-box threat model where the attacker has all of the advantages present for an adaptive chosen plaintext attack (control of the number of plaintexts and their content, and access to the resulting ciphertexts), as well as full access to the encrypting software. Thus, the attacker can arbitrarily trace execution and examine all sub-results, perform arbitrary static analyses on the software itself, or alter results of sub-computation (e.g., by using breakpoints) to perform perturbation analysis. The only restriction in this model is that the attacker does not have access to the processes by which the executing software was produced.

Hence, white-box cryptography is aimed at environments where protection is needed but isolation of the cryptographic computation itself from the attacker is for some reason not practical.

Also as noted above, the specific implementation of the algorithm is considered to be irrelevant to security in the black-box model. In the case of the white-box model, however, it becomes critical, and changing the specific implementation of the algorithm becomes the primary means for providing security. The invention provides ways to make finding hidden information combinatorially difficult for the attacker.

This description focuses on symmetric block ciphers where encryption requires only substitution boxes and linear transformations, using DES to provide a detailed example of hiding a key in the software. This is done because:

A) DES needs only linear transformations and substitution boxes, which simplifies the discussion; and B) triple-DES remains popular. The technique of the invention readily extends to handle it.

The invention is described with respect to the embedded key case, as opposed to cases where the key is presented dynamically to the software. Clearly though, the invention could be applied to such cases to limit the amount of information available to an attacker.

2.0 Terminology and Notation

This section outlines the terms and notation used in the general description of the invention. A more rigorous treatment is given in the section titled "Additional Observations on the General Invention" which follows.

A bit is an element of the Galois field of the integers modulo 2, that is, the binary set of {0, 1}. A bit-vector is a vector over this field, such as the six-bit vector [0 1 0 1 0 0], and a bit-matrix is a matrix over it. Other terms starting with the "bit-" prefix are similarly understood.

An expression such as $<e_1, e_2, e_3, \ldots, e_k>$ is a vector of k elements (the $e_i$'s). Whether the elements are bits will be evident from context.

We denote by P' an encoded function derived from the function P. $_m{}^nP$ denotes the same function as P, indicating that it maps vectors that are m-bits in length, onto vectors that are n-bits in length. $^nP$ is simply an abbreviation of $_n{}^nP$. $^kI$ is the identity function on k-vectors. $_m{}^nE$ (a mnemonic for an entropy-transference function) is any function from m-bit long vectors to n-bit long vectors such that, if m≦n, the mapping loses no bits of information, and if m>n, it loses at most n−m bits of information. $^nE$ is, of course, an abbreviation of $_n{}^nE$. Multiple occurrences of $_m{}^nE$ or $^nE$ in a given formula or equation denote the same function.

$v_i$ is the ith element of vector v, and $v_{i \ldots j}$ is the sub-vector containing the ith through jth elements. $_kv$ denotes the same bit-vector as v, indicating that v has k elements. $_ke$ (a mnemonic for an entropy-vector) is any vector with k elements. Multiple occurrences of $_ke$ within a given formula or equation denote the same vector. x⋮y is the concatenation of vectors x and y, and x⊕y is the bitwise Boolean exclusive-or (XOR) of x and y.

P∘Q is the composition of $_a{}^bP$ and $_c{}^dQ$ where a=d. P∥Q (the concatenation of P and Q) is that function $_{a+c}{}^{b+d}H$ such that $H(_ax \vdots _cy) = P(x) \| Q(y)$, so that $H(x \vdots y)_1 \ldots _b = P(x)$ and $H(x \vdots y)_{b+1} \ldots _{b+d} = Q(y)$. If P and Q have inverses, then $H^{-1} = P^{-1} \| Q^{-1}$. The concatenation function "⋮" is associative for vectors, and the concatenation function "∥" is associative for functions.

For a matrix M, $_m{}^nM$ denotes M, indicating that M has m columns and n rows. (If we interpret the application of M to a vector as a function application, this notation will be the same as above.)

3.0 De-Linearization and Substitution Boxes

A linear transformation (LT) is a vector-to-vector transformation function P from vectors to vectors which can be defined by $_m{}^nP(_me) = _m{}^nM_me + _nd$ for all $_me$, where M is a constant matrix and d is a constant displacement vector.

LTs are useful in mixing and reconfiguring information. In the black-box context, the LTs can be very simple, for example, the Expansion Permutations 46 and P-box Permutations 52 in DES (see FIG. 4). Note that a permutation of a vector is simply a rearrangement of the order of its values. For example, if S={5, 10, 15, 20}, then a permutation P might be defined as: P(1)=20, P(2)=5, P(3)=15 and P(4)=10.

In the white-box context, simple LTs cannot be used because they reveal too much information to the attacker. Thus, in the method of the invention, we:
A) use more complex LTs; and
B) disguise the LTs by converting them into non-linear functions.

3.1 Notes on Linear Transformations

The permutations used in DES are all LTs, as are its bitwise XOR operations 54, 56. Hence, DES is performed by LTs and substitution boxes (SBs) alone.

For a given m and n, there are $2^{mn+n}$ m-input, n-output LTs, but we are primarily interested in those which discard minimal, or nearly minimal, input information (that is, we prefer that m≦n). If m=n, then there are $$2^n \prod_{i=0}^{n-1} (2^n - 2^i)$$

bijective LTs, since there are $$\prod_{i=0}^{n-1} (2^n - 2^i)$$

non-singular n×n matrices (see: *Linear Groups, with an Exposition of Galois Field Theory*, Leonard E. Dickson, 1958, p. 77, Dover Publications, New York). A non-singular matrix is a matrix which is invertible.

It is the latter of these two equations which is of greater significance, since we will often use LTs to reconfigure information. Changing the displacement vector, d, of an LT affects only the sense of the output vector elements, and not how the LT redistributes input information to the elements of its output vector. (Recall the general form of an LT as noted above: $_m{}^nP(_me) = _m{}^nM_me + _nd$.)

There are $2^n!$ bijections of the form $^nP$. Considering the above formulas, we see that the proportion which are linear shrinks rapidly as the value of n increases. For example, there are $2^3! = 40,320$ bijections of the form $^3P$. Out of this number, $$2^3 \prod_{i=0}^{3-1} (2^3 - 2^i) = 1,344$$

are linear, or exactly one in 30. There are $2^5! \approx 2.631 \times 10^{35}$ bijections of the form $^5P$, of which $$2^5 \prod_{i=0}^{5-1} (2^5 - 2^i) = 319,979,520$$

are linear, which is about one in $8.222 \times 10^{26}$.

Nevertheless, the number of linear bijections $^nL$ becomes very large for large n. For example, there are about $6.442 \times 10^{42} \approx 2^{142.21}$ non-singular 12×12 matrices. This is a large number, considering that there are only a total of $2^{144}$ matrices with dimensions of 12×12.

Note that if A and B are LTs, then so is A∥B, and so is A∘B (where defined). LTs, per se, are of little use in white-box cryptography, because they are so easily decomposed by Gaussian elimination and related methods.

3.2 De-Linearized LTs and Encoded Functions

Let us consider how we can de-linearize LTs and encode functions in general:

3.2.1 Partial Evaluation

Suppose part of our input to a function $_m{}^nP$ is $_bv$, and we wish to replace v with a fixed constant, $v = _bc$. In DES, for example, we have many situations in which we have a transform with two inputs: some data input $_ax$, and a constant encryption or decryption key input $_bc$. By performing partial evaluation, we alter the transform to yield the same output in response to the input $_ax$, but the fixed encryption or decryption key input $_bc$ no longer appears in the program.

In mathematical terms, if the input to P is $_a x :_b c$, where m=a+b, then we can hide c by replacing P with $_a{}^n Q(_a e) = P(_a e :c)$ for all $_a e$. Thus, we end up with a new transform $_a{}^n Q$, which performs the same function as $_m{}^n P$, but incorporates in a concealed way, a constant as part of its input.

Note that $_a{}^n Q$ is smaller in size than $_m{}^n P$. This reduction occurs because part of the input to $_m{}^n P$ is constant; thus we have a restricted use of $_m{}^n P$, it is not necessary to pass the entire P domain into Q. Therefore, Q is smaller than P but no information is lost.

This process can be implemented in a variety of manners. A simple algorithm for its implementation is presented in the flow chart of FIG. 5.

Firstly, for a given function, $_m{}^n P$, the particular constant input, $_b c$, and its value, must be identified at step 70.

Next, the routine steps through all possible input values, $_a e$, for the original function, $_m{}^n P$, at step 72. For each possible input value, the output of $P(_a e :c)$ is calculated at step 74, and the output of $_a{}^n Q(_a e)$ for the given input is set to equal this $P(_a e :c)$ output at step 76.

When it is detected at step 72 that all possible input values have processed, then control passes to step 78 where the $P(_a e :c)$ function is replaced in its original program with the new $_a{}^n Q(_a e)$ transform, and this particular routine is complete. In the encoded program, only transform Q appears, and there is no transform P or constant $_b c$.

In other words, we know what the input is, and we know what output we want to obtain, so we generate a transformation which satisfies those requirements.

Of course, this routine may be incorporated in larger software routines, or be implemented in different manners. As well, transforms P and Q may or may not be linear, and may or may not be matrices.

3.2.2 Encoded Functions and Networks

This technique allows us to encode transforms so that the original transform is incorporated in the encoded program, but cannot be found by attacker. This is useful in DES, for example, where the same transforms are used many times; by encoding a given transform a different way each time it is used, the attacker cannot correlate all the instances of that transform.

For example, for an LT $_m{}^n L$, we could choose non-linear bijections $^m F_L$ and $^n G_L$ such that $L' = G_L \circ L \circ F_L^{-1}$ is non-linear. $F_L$ is referred to as the input coding, and $G_L$ the output coding, of L' with respect to L, and L' is an encoded LT. We can similarly encode a non-LT, X, as X' with input and output codings $F_X$ and $G_X$ respectively.

Clearly, the encoded algorithm must compensate for the F and G encodings so that it will operate properly. A straightforward way to do this is to implement a network of encodings. For example, if a software algorithm has successive transformations X and Y, we can generate encoded transforms X' and Y' which look nothing like X and Y, but in which the output coding of X is corrected by the input coding of Y. Since the output coding of X is incorporated in X' and the input coding of Y incorporated into Y', the fact that they are complements is not apparent at all.

Figure 6:
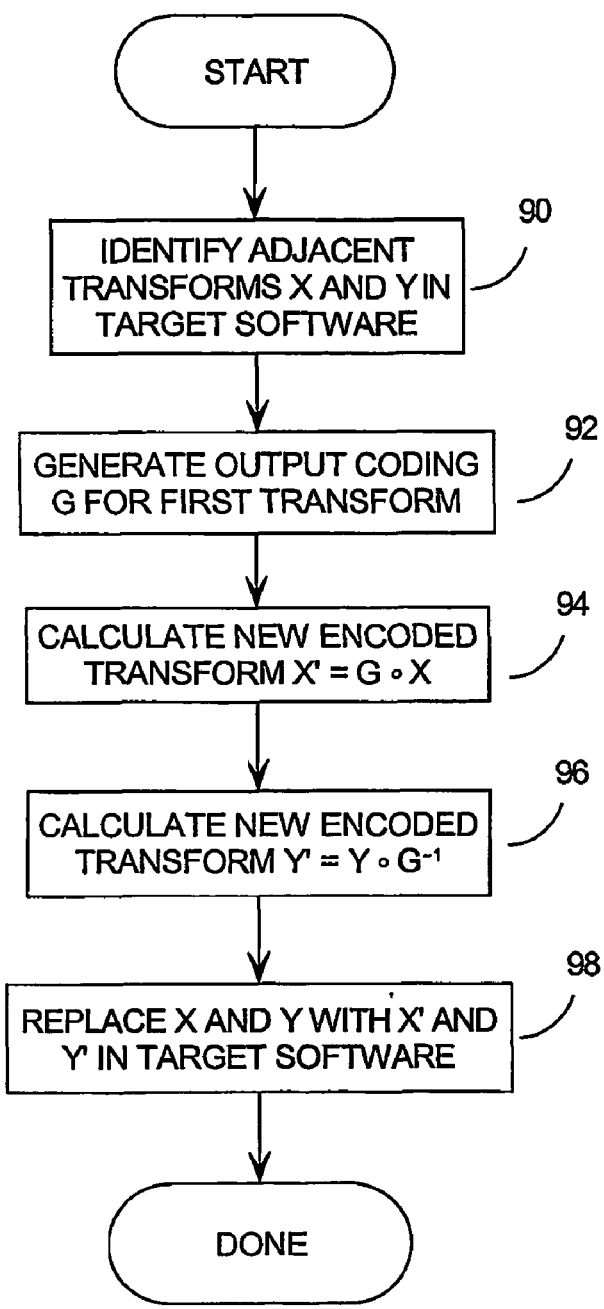
FIG. 6 presents a flow chart of a method of generating encoded functions and networks in an embodiment of the invention.

A exemplary method of effecting such a process is presented in the flow chart of FIG. 6.

Firstly, two adjacent transforms X and Y are identified in the target program at step 90. Next, a random output coding is generated at step 92, for the first transform X (similarly, of course, one could generate a random input coding for the second transform Y).

The encoded transform X' can now be calculated as $X' = G_X \circ X$ at step 94. As the input coding to transform Y must compensate for the $G_X$ encoding, the encoded transform Y' can now be calculated as $Y' = Y \circ G_X^{-1}$ (i.e. $F_Y = G_X$), at step 96.

The two transforms X and Y can now be replaced in the software program with the encoded transforms X' and Y' at step 98, and the routine is complete.

For $Y' \circ X'$ to be an encoding of $Y \circ X$, we require $F_Y = G_X$, since $Y' \circ X' = G_Y \circ Y \circ F_Y^{-1} \circ G_X \circ X \circ F_X^{-1}$. Variations on this theme can be implemented using "$\circ$", "$\|$", and bijective codings, thus we can construct encoded networks from encoded functions.

These encodings could be implemented a number of ways, for example, the values $^m F_X$ and $^n G_X$ could be chosen randomly. By being chosen randomly, it would be possible for one of $^m F_X$ or $^n G_X$ to be linear, but it is probably better to rely completely on randomness than to attempt to avoid linear transforms being generated.

This technique is also useful for disguising sparse matrices. Sparse matrices may provide an attacker with a weakness to exploit. This can be remedied simply by multiplying the sparse matrix with an encoding function which is random but generally dense, and placing the encoded sparse matrix and the inversion of the encoding function into the software algorithm. Thus, rather than facing a sparse matrix, the attacker will face two dense matrices.

3.2.3 Input/Output (I/O)—Blocked Encoding

In section 3.2.2 above, suppose that m and n are inconveniently large when we are encoding some linear or non-linear function P. The size of DES substitution boxes for example, grow as the power of two of the input size, so an eight bit input will require a table with a manageable 256 entries. However, a 16-bit input will require a memory and processing intensive 65,536 entries and 32-bits, an impractical $4.3 \times 10^9$ entries. Therefore, a technique which allows the size of functions to be reduced or divided into multiple, smaller functions, would be very useful.

Figure 7:
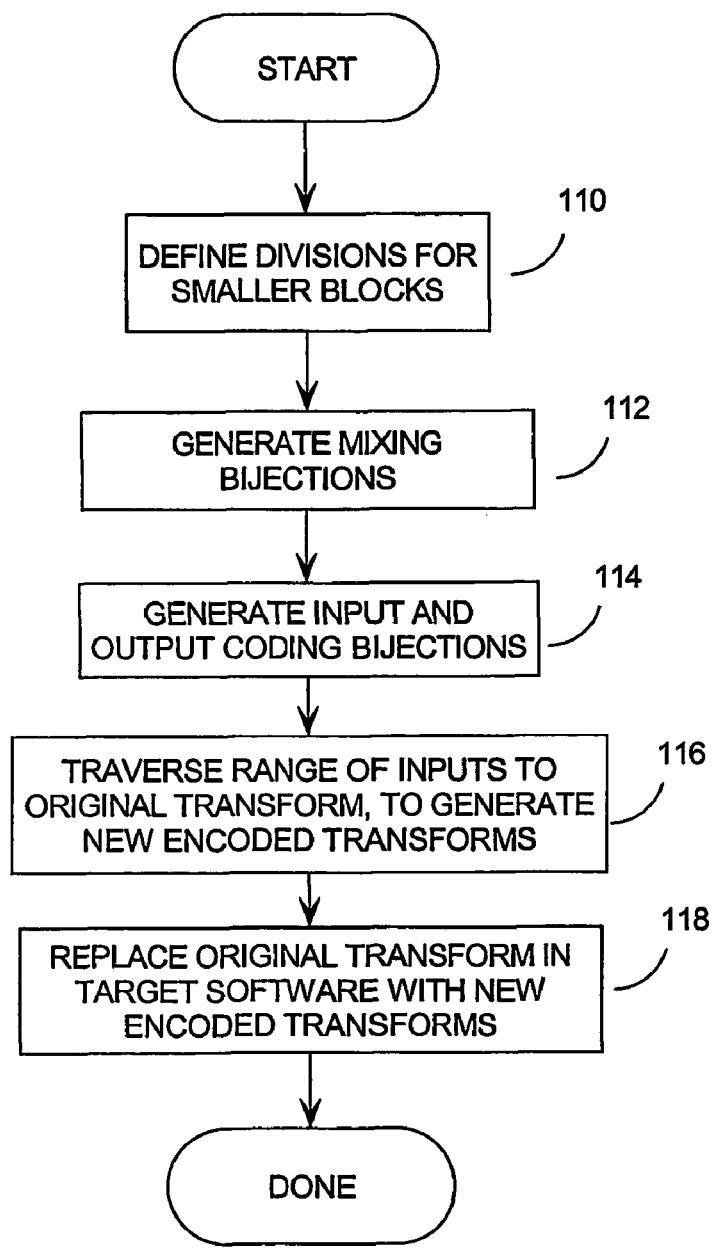
FIG. 7 presents a flow chart of a method of input/output-blocked encoding in an embodiment of the invention.

The growth of inconveniently large functions may easily occur for example, when using the linear blocking method of section 4.1. In that case, we can define input and output codings $F_P$ and $G_P$ for a function P, using the exemplary routine presented in the flow chart of FIG. 7. This routine proceeds as follows:

First, at step 110, we define m=ja and n=kb, as we want to map $_m{}^n P$ onto $_{ja}{}^{kb} P$. We intend to divide function $_m{}^n P$ into j×k blocks, each block having dimensions of a input bits and b output bits.

Next, we generate two 'mixing' linear bijections $^m J$ and $^n K$ (two bijective LTs each of which mixes the entropy of its input bits across all of its output bits as much as possible), at step 112. Alternatively, J and K could simply be randomly generated; whether a certain LT yields the desired mixing depends on the context. The only real restriction on J and K is that they be invertible.

At step 114, we now randomly choose non-linear input and output coding bijections F and G, which we partition as: $^a F_1, \ldots, ^a F_j$ and $^b G_1, \ldots, ^b G_k$. Clearly, there are j input encoding functions F, recognizing that the input to $_m{}^n P$ was divided out as m=ja. Thus, each F encoding function has dimensions a×a. The same applies for the output coding G, which is partitioned into k functions of dimensions: k input bits and k output bits. We then define $F_P = (F_1 \| \ldots \| F_j) \circ J$ and $G_P = (G_1 \| \ldots \| G_k) \circ K$.

Figure 5:
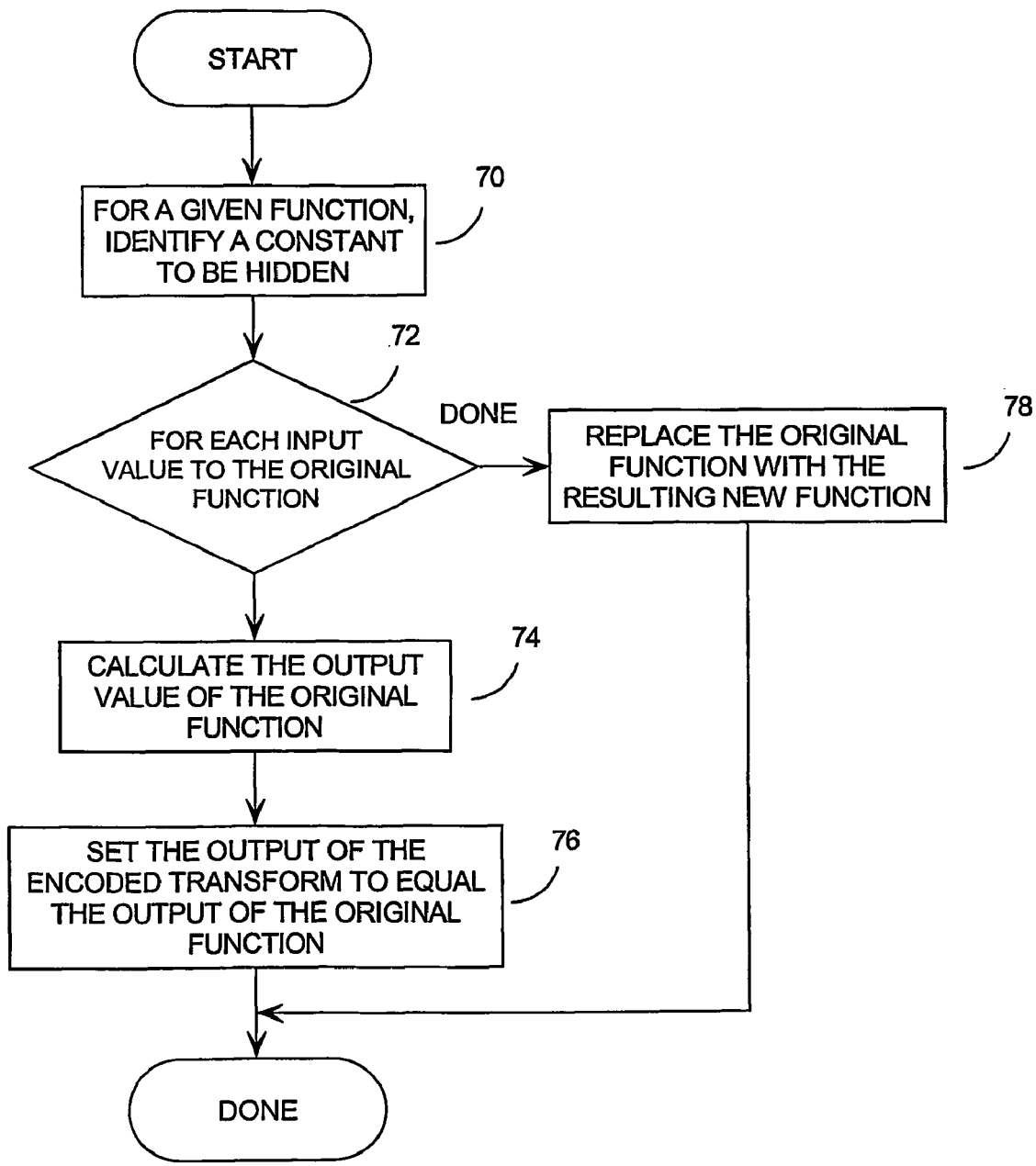
FIG. 5 presents a flow chart of a method of partial evaluation in an embodiment of the invention.

We can then generate an encoded function $P' = G_P \circ P \circ F_P^{-1}$ at step 116 in one of the manners described above: i.e. by traversing the range of inputs to P as described in steps 72 through 78 of FIG. 5, or simply solving the equation for P'.

The original transform P can then be replaced with the encoded transform P' in the targeted software program at step 118.

This permits us to connect with a "wide I/O" linear function in encoded form, since, prior to encoding, as a preliminary step, we only need to deal with J and K (that is, we may replace P with $K \circ P \circ J^{-1}$), which can be done using the smaller blocking factors of the $F_i$'s and $G_i$'s which we add during encoding.

That is, if the input to P is provided by an LT X, and the output from P is used by an LT Y, we would use $J \circ X$ and $Y \circ K^{-1}$ instead. Then the input and output coding of the parts can ignore J and K—they have already been handled—and deal only with the concatenated non-linear partial I/O encodings $F_1 \| \ldots \| F_j$ and $G_1 \| \ldots \| G_k$, which conform to smaller blocking factors.

As an example of the combinatorics for such encodings, consider the case where we must encode $^{12}P$. If we choose $a=b=4$, then $j=k=3$, and the number of choices for each of $F_P$ and $G_P$ is about $6 \times 10^{42}$ (non-singular $12 \times 12$ matrices)$\times 9 \times 10^{39}$ (choices for sequences of three non-linear block coding functions): about $5 \times 10^{82}$.

This easily extends to non-uniform I/O blocked encoding, i.e. where the groups of input and output encoding function are not all of identical dimensions.

3.2.4 Encoded Function Concatenations

For functions P and Q, one could concatenate them together and then choose an encoding of $P\|Q$ such as $G_{P\|Q} \circ (P\|Q) \circ F^{-1}{}_{P\|Q}$ (as per section 3.2.2 above). This mixes the input and output entropy of transform P with that of transform Q, making it harder for an attacker to separate and determine the components P and Q.

3.2.5 By-Pass Encoding

There are instances in which it is necessary to execute a transform, say ${}_m{}^nP$, but also to pass some or all of the input bits m, onto a subsequent operation. In DES, for example, there are a series of steps in which the data input on the right-hand side becomes the data for the left-hand side for the next round (see FIG. 4). So it would be desirable to perform the right-hand side calculations, but also pass the original input data to the output so that it can be used in the next round (for the left hand side calculations).

In general, this is done by concatenating a new function to the original transform, which does the job of transferring the desired bits through the encoded transform without being affected by the original transform. To carry a extra bits of entropy at the input, and b extra bits of entropy at the output, of ${}_m{}^nP$, where $a \geq b$, we can encode ${}_{m+a}{}^{n+b}P'$ as $G^{P\|E} \circ (P\|_a{}^bE) \circ F^{-1}{}_{P\|E}$, where ${}_a{}^bE$ is the by-pass component of P'.

Figure 8:
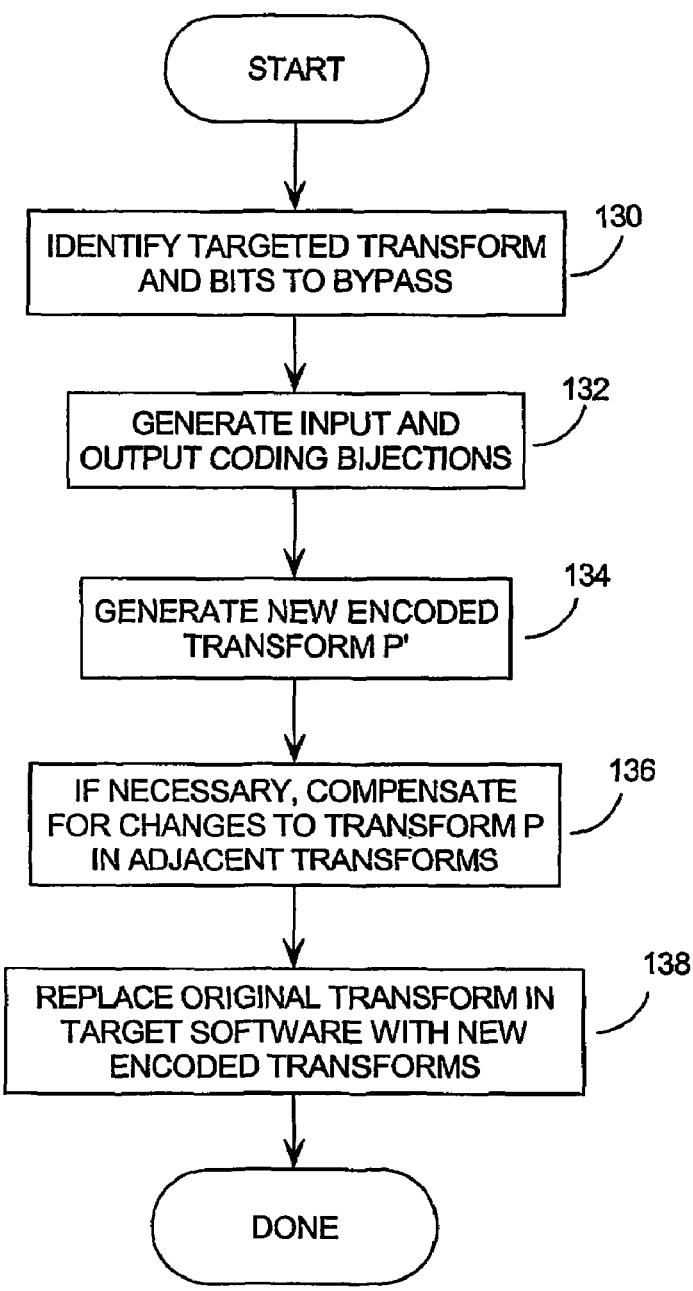
FIG. 8 presents a flow chart of a method of by-pass encoding in an embodiment of the invention.

The process of generating the transform ${}_{m+a}{}^{n+b}P'$ is basically the same as described above with respect to the generation of other encoded transformations. As per the flow chart of FIG. 8, the process begins at step 130 by identifying a targeted transform ${}_m{}^nP$ and the extra bits that are to be passed through the encoded transform ${}_{m+a}{}^{n+b}P'$, that is, the a and b bits.

Input and output encoding transforms F and G are then generated at step 132, in the manner described herein.

The encoded transform is then generated at step 134, in a manner consistent with the nature of the transform, for example, by traversing all possible inputs to the original transform ${}_m{}^nP$, and defining ${}_{m+a}{}^{n+b}P'$ as equal to $G_{P\|_a{}^bE} \circ (P\|_a{}^bE) \circ F_{P\|_a{}^bE}{}^{-1}$. If the original transform ${}_m{}^nP$ is a matrix, for example, then ${}_a{}^bE$ will be a matrix that selects the desired bits from the input, and allows them to be passed through the encoded transform ${}_{m+a}{}^{n+b}P'$.

Next, we compensate for the input and output encoding transforms F and G (if necessary) by generating new compositions for transforms adjacent to the original transform ${}_m{}^nP$ in the targeted software algorithm, at step 136 (say transforms X and Y). We then replace original transform ${}_m{}^nP$, and adjacent transforms X and Y, in the targeted software program, with their respective encoded transforms P', X' and Y' at step 138.

If $m+a=n+b$, then P' is locally secure. A function which is locally secure has the property that every original function is just as likely as every other original function. Thus, given only the encoded results, an attacker cannot tell with any probability whether one original input was more likely than another (see section 3.3).

If ${}_a{}^bE$ has the specific form ${}^aI$ (so that $a=b$), it can be referred to as identity by-pass encoding, so the compensation at step 136 will not have to be performed. Non-identity bypasses may also be performed, but the non-identity transformation encoding will have to be undone. This can easily be done by incorporating the inversion transform into the adjacent transforms at step 136.

However, varying the input and output codings arbitrarily, if $a > b$, we cannot arbitrarily substitute the by-pass component without affecting the set of functions obtained. Its (vector-set valued) inverse mapping implies a particular partition of the possible input subvectors for that component (where elements of a partition element agree on the original P input vector). We cannot entirely hide the cardinalities (i.e. the number of elements) in the subsets forming this partition.

That said, even if some statistical attack finds these cardinalities, it may yet remain quite difficult to resolve the input and output codings of P'.

3.2.6 Split-Path Encoding

For a function ${}_m{}^nP$, we may disguise it by concatenating it with another function which may be arbitrary. For example, we could encode function ${}_m{}^nP$ into function ${}_m{}^{n+k}X$, where $X({}_me) = P({}_me):{}_m{}^kR({}_me)$ for all ${}_me$, and R is some arbitrary, fixed function.

The effect is that, if P is lossy (i.e. information can be obtained by observing processing on transform P), then X may lose less information or no information at all (processing on X is obscured to the observing, by the addition of the processing on R). In particular, we can use this method to achieve local security, as described in section 3.3.

The generation of the encoded transform X, is done in the same manner described above with respect to FIGS. 5 through 8.

This technique adds new redundant processing into the data flow of the program. This redundant processing is substantive in that it becomes integral with the encoded transform X, and cannot easily be identified or removed. This is in contrast to "dummy code" used in the art, which does not actually execute and can be identified using data flow analysis techniques. With the method of the invention, it is quite difficult to distinguish which operations are from the original software code, and which have been added.

As these redundant arguments ultimately have no impact on the outcome of the software program, they can be generated randomly. Techniques for generating random and pseudo-random numbers are known in the art.

3.2.7 Simultaneous By-Pass Encoding

In some cases, we may wish to perform some function on an input, and yet preserve the input in the output for later use (but not separate from the output as we did in section 3.2.5).

This may be feasible if we can arrange that our function is encoded as a bijection, as a bijection has a one to one mapping between inputs and outputs.

Suppose, for example, that we have a bijective encoded function $P'=G_X \circ X \circ F_X^{-1}$ where $X$ is derived from $P$ using split-path encoding (see section 3.2.6). We can view this same function as $Q'=G_Q \circ Q \circ F_Q^{-1}$ where we define $Q=F_Q=_m{}^m I$ for an appropriate m, and $G_Q=P'$. That is, we use an identity input encoding for an identity and regard P' as the output coding. Then applying its inverse, $P'^{-1}$, to the output, we retrieve the input. By encoding the inverse of P' (for example, combining it with a subsequent transformation), we can conceal the use of the inverse of P', which need not appear as such in an implementation.

The generation of the encoded transform is done in the same manner described above with respect to FIGS. 5 through 8.

3.2.8 Output Splitting

This technique is useful for disguising outputs where input information can be well hidden. This does not appear to be the case for DES: for implementations of DES, output splitting is not recommended since it cannot provide much security.

Where the technique is appropriate, to make statistical "bucketing" attacks more difficult, we may encode a function P as $k \geq 2$ functions, $P_1, P_2, \ldots, P_k$, where each encoding can mix in additional entropy as described in sections 3.2.4 or 3.2.5 above, and where the output of all of the encoded $P_i$'s is needed to determine the original output of P.

For example, given a function $_m{}^n P$, we can choose k=2, define $_m{}^n P_1$ to be a randomly selected fixed $_m{}^n E$, and define $_m{}^n P_2 (_m e) = P(_m e) \oplus P_1 (_m e)$ for all $_m e$.

At this point, we can compute the P output from the exclusive-or of the outputs of the two $P_i$'s. However, after we then independently encode the $P_i$'s, the output of $P_1$ and $P_2$ is not combinable via an LT into information about P's output.

3.3 Substitution Boxes and Local Security

We can represent any function $_m{}^n P$ by a substitution box (SB): an array of $2^m$ entries, each of n bits. To compute $P(x)$, find the array entry indexed by the binary magnitude x. The exponential growth in SB size with its input width, limits SBs to the representation of narrow input functions.

When an SB represents L' or X' (where L is an LT and X is a non-linear transform), then if m=n, and L or X is bijective, the SB for L' or X' bijection is locally secure: irrespective of L or X, we can always choose an input or output coding such that the SB of L' or X' is that SB. Locally, any information about L or X, other than the value of n and that it is a bijection, cannot possibly be discovered from the encoded SB of L' or X' itself (which only means, of course, that an attack must be non-local).

The lossy case is not locally secure. When a slightly lossy encoded function is represented as an SB, some information about the function beyond its input and output widths can be found by examining its SB. Completely understanding it, however, still requires a non-local attack (as we will see in the DES example).

The price of using such a protean representation is that SBs are often redundant, and may include considerable non-productive entropy. For some practical implementations, one may need something less bulky. Of course, any substantial implementation shrinkage compared to an SB implies restrictions on input and output codings.

Plainly, for any function $_m{}^n P$ and any bijection $_m B$, the SB for $P \circ B$ has the same elements as the SB for P, but (unless $B=_m{}^m I$) in a different order.

4.0 Wide-Input Encoded LTs: Building Encoded Networks

Because of the previously noted immense storage needs of wide-input SBs, it is infeasible to represent a wide-input encoded LT by an SB. One can, however, construct networks of SBs which implement a wide-input encoded LT.

4.1 A Blocking Method

The following construction is protean: it can handle LTs in considerable generality, including compositions of LTs, and for a wide variety of LTs of the form $_m{}^n L$ encoded as $_m{}^n L'$, the form of the network can remain invariant except for variations in the bit patterns within its SBs.

For an LT, L, we simply partition the matrix and vectors used in the LT into blocks, giving us well-known formulas using the blocks from the partition which subdivide the computation of L. We can then encode the functions defined by the blocks, and combine the result into a network, using the methods in section 3.2 above, so that the resulting network is an encoding of L.

Consider an LT, L, defined by $_m{}^n L(_m e) =_m{}^n M\ _m e +_n d$ for all $_m e$: we choose partition counts $m_\#$ and $n_\#$ and sequences $<m_1, \ldots, m_{m_\#}>$ and $<n_1, \ldots, n_{n_\#}>$, such that $$\sum_1^{m_\#} m_i = m \text{ and } \sum_1^{n_\#} n_i n.$$

That is, the former sequence (the m-partition) is an additive partition of m, and the latter sequence (the n-partition) is an additive partition of n.

The m-partition partitions the inputs and the columns of M; the n-partition partitions d and the outputs. Hence, the i, jth block in partitioned M contains $m_i$ columns and $n_j$ rows, the ith partition of the input contains $m_1$ elements, and the jth partition of d or the output contains $n_j$ elements.

At this point, it is straightforward to encode the components (of the network forming L) to obtain an encoded network, by the methods of section 3.2, and then representing it as a network of SBs (see section 3.3). In such a network, none of the subcomputations is linear each is encoded and represented as a non-linear SB.

A naive version of this consists of a forest of $n_\#$ trees of binary 'vector add' SBs, with $m_\#$ ($m_\#$-1) 'vector add' nodes per tree. At the leaves are $m_\#$ unary 'constant vector multiply' nodes, and at the root is either a binary 'vector add' node (if there is no displacement) or a unary 'constant vector add' node (if there is a displacement).

However, we can eliminate the unary 'constant vector add' and 'constant vector multiply' nodes entirely. We simply compose them into their adjacent binary 'vector add' nodes, thereby saving some space by eliminating their SBs.

A potential weakness of this entire approach is that the blocking of L may produce blocks, such as zero blocks, which convert to SBs whose output contains none, or little, of their input information. This narrows the search space for an attacker seeking to determine the underlying LT from the content and behaviour of the network. However, so far as we have yet determined, such blocked implementations remain combinatorially quite difficult to crack, especially if we apply the proposals below.

For example, the potential weakness noted above, can be addressed as follows:

A) when mixing entropy by the methods of section 3.2, do so opportunistically, in a manner calculated to avoid such blocks; and B) instead of encoding $_m{}^nL$, find linear $_m{}^nL_1$ and $^mL_2$, such that $L_2$ is a 'mixing' bijection (its input information is spread as much as possible across all output bits), and generate $L_1=L\circ L_2^{-1}$. Encode the two functions separately into networks of SBs, and connect the outputs of the $L_2'$ representation to the inputs of the $L_1'$ representation, thus creating a representation of $L_1'\circ L_2'=L'$.

While the above methods help, it is not easy, in general, to eliminate m×n blocks which lose more bits of input information than the minimum indicated by m and n. For example, if we partition a matrix $^{kn}M$ into k×k blocks, we cannot guarantee that all of the k×k blocks are non-singular (i.e. can are invertible), even if the rank of M is greater than k. Hence, if M is non-singular, a partition of M into square blocks may contain some singular (lossy) blocks.

Therefore, some information about an encoded LT may leak in its representation as a blocked and de-linearized network of SBs when this blocking method is used.

5.0 Example: An Embedded, Hidden Key Implementation of DES

We now discuss an implementation of DES that is resistant to a white-box attack. The implementation presented here has weaknesses, both in security and efficiency, which are addressed in sections 5.4 and 7.

As described above with respect to FIGS. 3 and 4, DES is performed in 16 rounds, each round employing the same eight DES SBs (DSBs), $S_1$ through $S_8$, and the same LTs, sandwiched between initial and final LTs (the initial and final permutations). Each DSB is an instance of $_6{}^4E$. Two rounds of standard DES are presented in the bock diagram of FIG. 9.

5.1 Replacing the DES SBs

Figure 9:
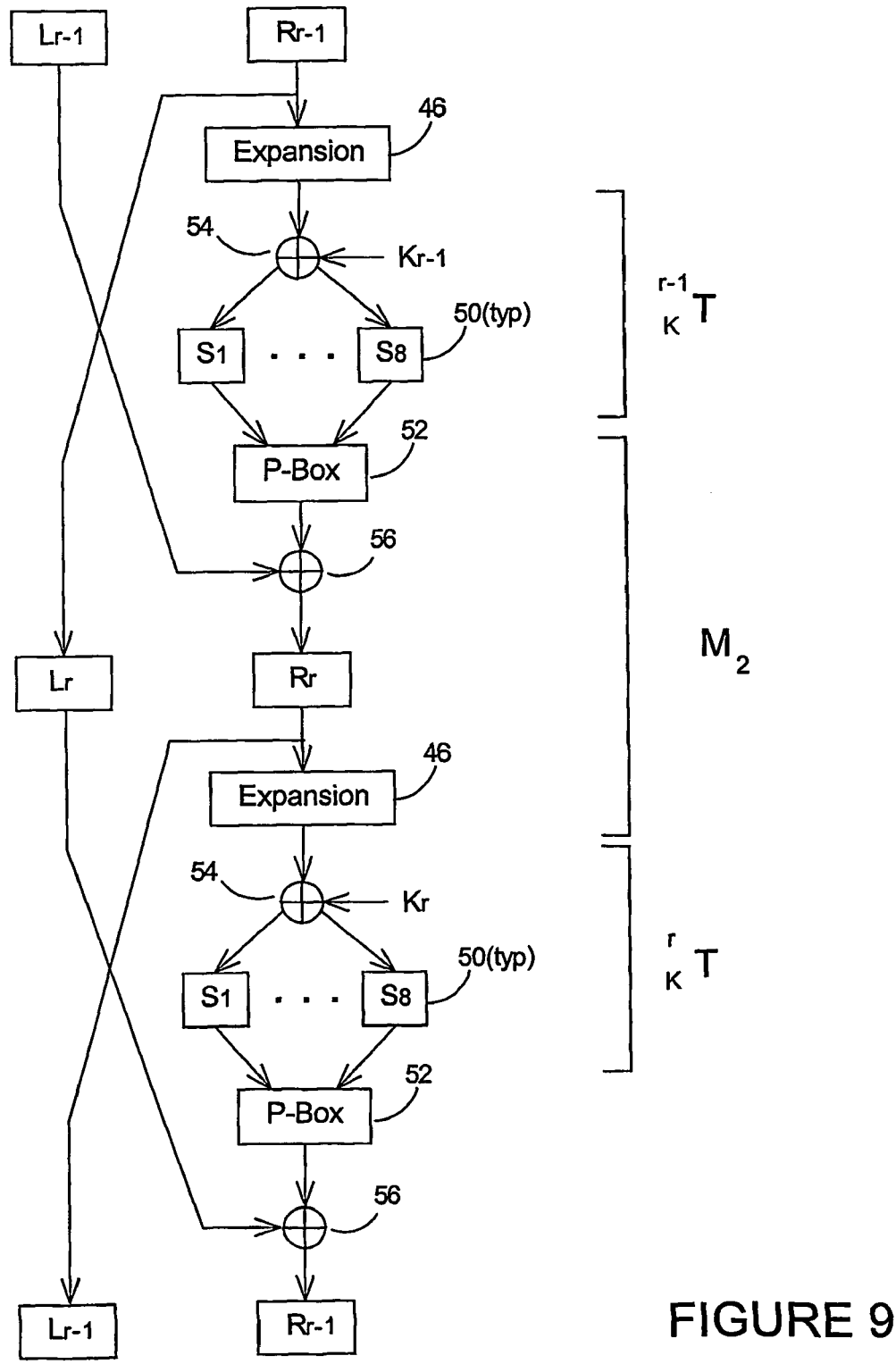
FIG. 9 presents a data flow diagram of two rounds of DES with targeted sections identified, in an embodiment of the invention.

In FIG. 9, an unrolling of two typical DES rounds is presented. The round structure implements a Feistel network with a by-pass left-side data-path (consisting of blocks $L_{r-1}$, $L_r$, $L_{r+1}$) and an active right-side data-path (the balance of the processing blocks).

$K_r$ is the 48-bit subkey for a given round r, which is constant for a particular application. As noted above, DES only uses 48 bits of the 56 bit key in a given round.

This section describes how we replace the DSBs with new SBs so that:

A) the key is eliminated by partial evaluation (it is encoded into the new SBs; see section 3.2.1 above); and
B) sufficient by-pass capacity is added per new SB so that all of the remaining connectivity within a round can be carried via the new SBs.

5.1.1 Eliminating the Overt Key by Partial Evaluation

In each round, a DSB's input is the Boolean exclusive-OR (XOR) of 'unpredictable' information, not determined by the algorithm plus the key, and 'predictable' information, determined by the algorithm and the key. This predictable information can be determined in advance, without any knowledge of the unpredictable information.

Hence, we can dispense with the 'predictable' information entirely by modifying the DSBs into new SBs. The reason is that the XOR of the 'unpredictable' information (the argument) with 'predictable' information (a constant) is a bijection (see the last paragraph in section 3.3).

Let us therefore produce new SBs identified as $_K{}^rS_i$, where K is the encryption key, r is the round number, and i is the corresponding DSB number, such that, for any given input, $_K{}^rS_i$ yields the same result as $S_i$ would produce in round r if the DES key were K, but the XORs of the inputs of the original DSBs have been eliminated (see section 3.2.1). Each of the $_K{}^rS_i$ substitution boxes, of which there are 16×8=128 (16 rounds, 8 S-boxes per round), is still in $_6{}^4E$ form.

At this point, the overt key K has disappeared from the algorithm: it is represented in the contents of the $_K{}^rS_i$'s. This permits us to remove the XORs ("⊕") with the inputs to $S_1, \ldots, S_8$ shown in FIG. 9.

5.1.2 Preparing the Modified DSBs for Local Security

In grey-box (Smart Card) implementations of DES the DSBs have proven to be effective sites for statistical bucketing attacks (again, see: *Introduction to differential power analysis and related attacks*, 1998 by Paul Kocher, Joshua Jaffe and Benjamin Jun). To make such attacks more difficult for our white-box implementation, we replace the $_K{}^rS_i$'s with new SBs which can be made locally secure (see section 3.3) using suitable input and output encodings. That is, we convert the SBs into $^8E$ form by defining:

$$_K{}^rT_i(_8e) = _K{}^rS_i(_8e_{1\ldots 6}) \| R(_8e)$$

for all $_8e$, for the fixed key K, for round $r=1, \ldots, 16$, for SB number $i=1, \ldots, 8$, where we define $R(_8e) = <_8e_1, _8e_6, _8e_7, _8e_8>$ for all $_8e$. This is an application of split-path encoding (see section 3.2.6).

The plan is that the first six bits of the input of a transform $_K{}^rT_i$ will be the 6-bit input to DSB i in round r. We then add two extra input bits. Hence, the left 4-bit half of the output of transform $_K{}^rT_i$ is the output of DSB i in round r, and the right 4-bit half contains the first and last input bits of DSB i in round r followed by the two extra input bits. That is, the right half of the output contains copies of four of the input bits.

To see that each transform $_K{}^rT_i$ is a bijection, we note that the function $F_{a, b, c, d}$ defined for any constant bits a, b, c and d by $F_{a, b, c, d}(_4e) = _K{}^rT_i(<a>\|_4e\|<b,c,d>)$ is a bijection. Every row of every DSB contains a permutation of $<0, \ldots, 15>$, with the row selected by the bits corresponding to a, b above. The XOR with the relevant bits of the key K effectively re-orders this permutation into a new permutation. The output of $F_{a, b, c, d}$ is therefore a bijection, mapping the $_4e$ according to a 1-to-1 mapping of the input space determined by a permutation. Since $_K{}^rT_i$ simply copies the bits corresponding to a, b, c and d to the output, transform $_K{}^rT_i$ preserves all of its input entropy; that is, it is a bijection.

5.1.3 Providing 64 bits of By-Pass Capacity

At this point, in order to carry all data from each round into the next, our first thought would be to employ simultaneous by-pass (see section 3.2.7), whereby the eight $_K{}^rT_i$'s in round r would have sufficient capacity to carry all of the information from a previous round into the next round, and each $_K{}^rT_i$ would be locally secure (see section 3.3). The capacity needed is 64 bits, and 8×8=64.

Unfortunately, there are two problems with this idea:

A) this is not enough capacity as some of the DSB inputs are redundant. The 32 bits of the right-side data-path of DES's Feistel network are presented as 48 bits to the DSB inputs by the Expansion transform (see the output of the QPMd Expansion Permutation in FIG. 4 and also in FIG. 9). Hence, even if all of the right-side 32 bits were present, the eight boxes have only 16 available bits left to carry the 32-bit left-side information (eight $_K{}^rT_i$ boxes, with 6 of their 8-bit capacity already required for the right hand side, means 8×6=48 bits for the right hand side and 8×2=16 bits for the left hand side); and B) even if we were to add the extra capacity, simultaneous by-pass would require an 8×8 encoding, but we want 4×4 encodings for matrix blocking. (It is simpler to implement the encoded networks using matrix blocking if we use a constant blocking factor, and finding the required large matrices with invertible blocks is much faster for the smaller blocking factor.) Hence, we need redundancy so that we can recover the original inputs without needing to use an 8×8 decoding.

Since each $_K{}^rT_i$ must be a bijection to support local security, and we will not use 8×8 decoding, we are therefore prevented from using simultaneous by-pass encoding. As a result, each $_K{}^rT_i$ effectively carries only four bits of input to the next round.) This includes two bits from the right side data path of DES, plus the two extra input bits which we can take from wherever we wish. The by-pass capacity of the $_K{}^rT_i$'s is too small by 32 bits.

So we add four more SBs, designated (pre-encoding) as $_K{}^rT_9, \ldots, _K{}^rT_{12}$. Each is a linear instance of $^8E$ prior to de-linearization and encoding. They provide the remaining 32 bits: 16 bits of right-side by-pass capacity, and 16 bits of left-side by-pass capacity.

5.2 Connecting and Encoding the New SBs to Implement DES

Figure 10:
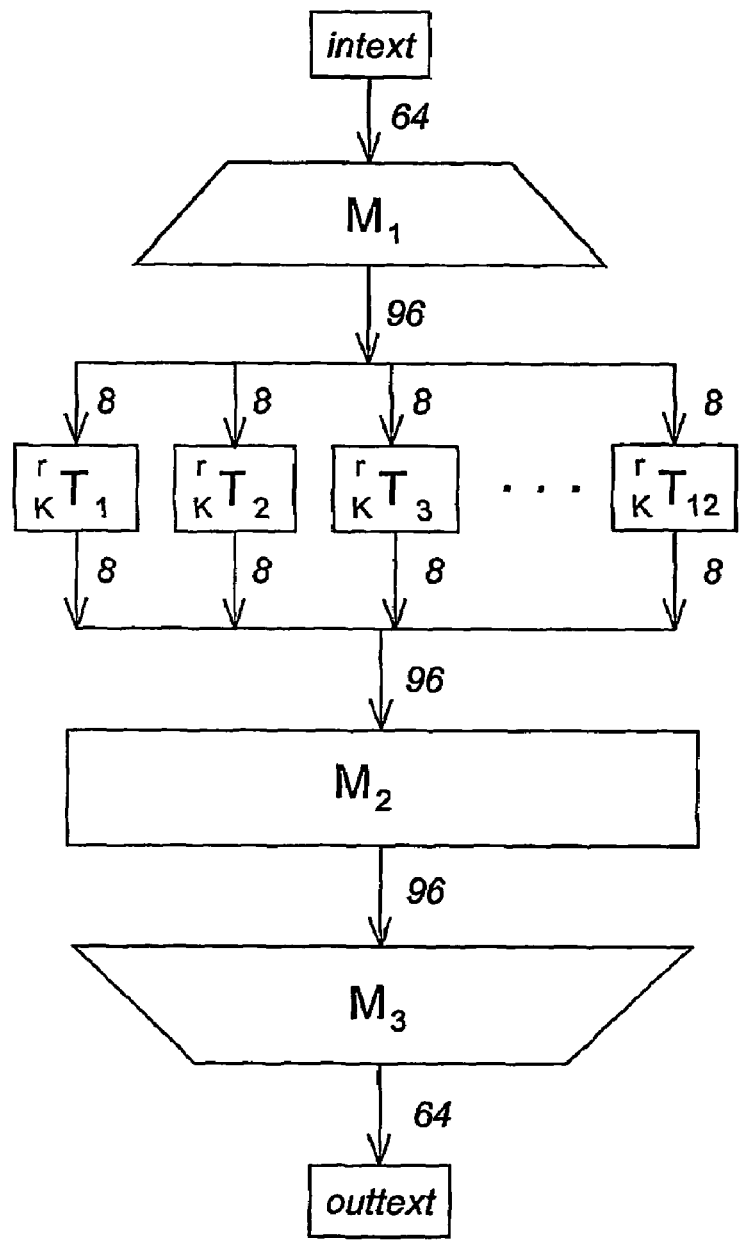
FIG. 10 presents a data flow diagram of two rounds of DES modified in a manner of the invention.

The over-all data-flow structure of our DES implementation immediately prior to de-linearization of LTs and encoding of SBs (see sections 3.2 and 3.3), is shown in the block diagram of FIG. 10.

The data-flow would look just the same after de-linearization and encoding, except that each $M_i$ would be replaced by a corresponding encoded transform $M_i'$ and each $_K{}^rT_i$ would be replaced by a corresponding $_K{}^rT_i'$. Except for the fact that the transforms have been encoded (represented by the "'" characters) it would be identical.

5.2.1 Data-Flow and Algorithm

Before de-linearization and encoding, each $M_i$ is representable as a matrix, with forms $_{64}{}^{96}M_1$, $_{96}{}^{96}M_2$, and $_{96}{}^{64}M_3$, respectively. These transforms and how they are generated are discussed in section 5.2.2.

In FIG. 10, italic numbers such as 8 and 64 denote the bit length of the vectors traversing the data path to their left. Arrows represent data-paths and indicate their direction of data-flow.

The appearance of rows of $_K{}^rT_i$'s in order by i in FIG. 10 does not indicate any ordering of their appearance in the implementation: the intervening $M_i$ transformations can handle any such re-ordering. Let us suppose that there is a re-ordering vector $_{12}z$, where z is a permutation of <1, ..., 12>. We define $_K{}^rT=_K{}^rT_{z_1} \| \ldots \|_K{}^rT_{z_{12}}$ for r=1, ..., 16. The $_K{}^rT'$s are defined the same way, but with "'" characters added to the $_K{}^rT_i$'s. Note that each $_K{}^rT$ or $_K{}^rT'$ s an instance of $^{96}E$.

Without the "'" characters (that is, prior to de-linearization and function encoding: see section 3.2) the modified DES algorithm may be represented in pseudo code as follows:

v=$M_1(intext)$ for r:=1, ..., 16 loop v:=$M_2(_K{}^rT(v))$ end loop outtext:=$M_3(v)$ We use the terms intext and outtext in the pseudo code, rather than plaintext and ciphertext, because:
A) the same implementation approach can be used for both encryption and decryption; and
B) in some of the scenarios discussed in section 6, neither the initial input nor the final output is a simple plaintext or ciphertext.

The algorithm is the same, except for addition of the "'" characters, after de-linearization and function encoding.

5.2.2 The Transfer Functions

In constructing $M_1$, $M_2$, and $M_3$, we must deal with the sparseness of the matrices for the LTs used in standard DES. The bit-reorganizations, such as the Expansion 46 and P-box transform 52 appearing in FIG. 9, are all 0-bits except for one or two 1-bits in each row and column. The XOR operations ("⊕" in FIG. 9) are similarly sparse.

Therefore, we use the second method proposed for handling sparseness in section 4.1: doubling the implementations into two blocked implementations, with the initial portion of each pair being a 'mixing' bijection. We will regard this as part of the encoding process, and discuss the nature of the $M_i$'s prior to this 'anti-sparseness' treatment.

The following constructions all involve only various combinations, compositions, simple reorganizations, and concatenations of LTs, and are therefore straightforward:

A) $M_1$ combines the following:
   i) the initial permutation of DES (QPMa 38 in FIG. 3);
   ii) the Expansion 46 in FIGS. 4 and 9, modified to deliver its output bits to the first six inputs of each $T_i$; combined with
   iii) the delivery of the 32 left-side data-path bits to be passed through the by-pass provided by inputs 7 and 8 of $_K{}^rT_1, \ldots, _K{}^rT_8$ and 16 bits of by-pass provided at randomly chosen positions in the four "dummy" transforms, $_K{}^rT_9, \ldots, _K{}^rT_{12}$, all in randomly chosen order.

B) $M_2$ combines the following:
   i) the first P-box transform 52 (see FIG. 9);
   ii) the XOR of the left-side data with the P-box output (the first XOR 56 in FIG. 9);
   iii) extraction of the original input of the right-side data-path using the method of section 3.2.7,
   iv) the second Expansion 46 of FIG. 9; and
   v) the left-side by-pass, as in $M_1$.

C) $M_3$ combines the following:
   i) ignoring the inputs provided for simultaneous by-pass,
   ii) the left-side by-pass, as in $M_1$,
   iii) inversion of the Expansion, ignoring half of each redundant bit pair,
   iv) swapping the left-side and right-side data (DES effectively swaps the left and right halves after the last round), and
   v) the final permutation 40 (see FIG. 3).

5.2.3 Blocking and Encoding Details

We recommend using 4×4 blocking for the $M_i$'s. As a result of the optimization noted in section 4.1 this means that the entire implementation consists entirely of networked 8×4 ("vector add") and 8×8 ($_K{}^rT_i'$) SBs.

Aside from $M_1$'s input coding and $M_3$'s output coding, both of which are simply $_{64}I$ (appropriately blocked), all SBs are input- and output-coded using the method of section 3.2.3 in order to match the 4-bit blocking factor required for each input by the binary 'vector add' SBs.

5.2.4 Naive and Recommended Variants

The above material completes the naive or 'naked' variant of white-box DES. The recommended variant pre- and post-whitens DES as follows: we use an intext and outtext encoded as a whole using the method of section 3.2.3 (or better yet, similarly encoded but in much larger blocks, with chaining). This completely foils statistical 'bucketing' attacks depending on the control of unencoded bits.

That is, we modify the scheme shown in FIG. 10, so that $M_1$ is replaced by $M_1 \circ M_0$ and $M_3$ is replaced by $M_4 \circ M_3$, where the $M_0$ and $M_4$ LTs are 'mixing' bijections. Each of $M_1 \circ M_0$ and $M_4 \circ M_3$ is, of course, a single LT. When it is encoded in 4-bit blocks, it becomes non-linear.

The additional mixing transforms $M_0$ and $M_4$ can be added in separate processing steps after the above is performed.

5.3 Complexity of Attacks on the Naive Variant

In its naive form, where intext is plaintext (for encryption) or ciphertext (for decryption, or outtext is ciphertext (for encryption) or plaintext (for decryption), the DES implementation can be cracked by statistical bucketing. Thus, one should generally avoid the naive form for DES applications. Instead, one should use an encoded intext and an encoded outtext.

The attacker cannot possibly extract information from the $_K{}^rT_i'$ transforms themselves as they are locally secure (see section 3.3).

By far the best place to attack our implementation in naive form seems to be at points where information from the first and last rounds is available. In the first round (round 1), the initial input is known (the $M_1$ input is not coded), and in the last round (round 16), the final output is known (the $M_3$ output is not coded).

Attacks should be focussed on the first (1) and final (16) rounds. Cracking either round 1 or round 16 provides 48 key bits; the remaining 8 bits of the 56-bit DES key can then be found by brute-force search on the 256 remaining possibilities using a reference DES implementation.

For an attack on round 1, the attacker should focus on the $_K{}^rT_i'$ inputs to round 2, and for an attack on the last round, on the $_K{}^rT_i'$ outputs from round 15. The attacker then deals with the input or output information after it has been broken up from (round 1), or before it has been merged into (round 16), the 8-bit bundles input to and output from the $_K{}^rT_i'$ transforms.

Consider any round 1 DSB $S_i$ in standard DES. Its input is affected by 6 bits of the round 1 sub-key, and two of its output bits affect only one DSB in round 2. We focus on one of these output bits, which we denote b. $S_j$ will then refer to the round 2 DSB which is affected by b.

We make a guess on the 6 bits of sub-key affecting $S_i$, and choose a set of plaintexts, denoted $I_0$, which have the property that if our key guess is correct, bit b will have a value of 0 for the encryption of each plaintext in the set. We similarly choose a set $I_1$, such that if our key guess is correct, b will have a value of 1.

The encryption of the texts in $I_0$ (resp. $I_1$) will lead to a set of inputs $I_0'$ (resp. $I_1'$) to $^2T_{z_j}$. The important point is that if our key guess is correct, $I_0'$ and $I_1'$ must necessarily be disjoint sets, whereas if our key guess is incorrect, the elements of $I_0'$ and $I_1'$ will be instances of $_8e$. We would like the probability that no collision (an element occurring in both $I_0'$ and $I_1'$) occurs in the event of an incorrect key guess to be no greater than $2_{-6}$. Experimentally, this occurs when $|I_0'|=|I_1'|\approx 27$.

We note that DSB output bits {3, 7, 11, 15, 18, 24, 28, 30} have the property that each bit comes from a unique SB and goes to a unique SB in the following round. By tracking these bits, we can search for the sub-key affecting each round 1 DSB in parallel (this requires a clever choice of elements for $I_0$ and $I_1$, because of the overlap in the inputs to the round 1 DSBs). Again, experimentation shows that fewer than $2^7$ plaintexts are necessary in total to identify a very small set of candidates for the 48-bit round 1 subkey. The remaining 8 bits of key can subsequently be determined by exhaustive search.

This gives a cracking complexity of 128 (chosen plaintexts)×64 (number of 6 bit sub-sub-keys)+256 (remaining 8 bits of key)+256 encryptions. This attack has been implemented, and it successfully finds the key in under 10 seconds.

Note of course that this represents a worst-case scenario for a particular DES application. The effectiveness of each method of the invention will depend on the particulars of the specific application, which can easily be analysed.

5.4 Complexity of Attacks on the recommended Variant

The recommended variant of the implementation uses an intext and outtext encoded as a whole using the method of section 3.2.3 (or better yet, similarly encoded but in much larger blocks, with chaining). This completely foils statistical 'bucketing' attacks depending on the control of unencoded bits.

That is, we modify the scheme shown in FIG. 10, so that $M_1$ is replaced by $M_1 \circ M_0$ and $M_3$ is replaced by $M_4 \circ M_3$, where the $M_0$ and $M_4$ LTs are 'mixing' bijections. Each of $M_1$ and $M_0$ and $M_4 \circ M_3$ is, of course, a single LT. When it is encoded in 4-bit blocks, it becomes non-linear. This might not seem useful, but as explained in section 6, it is highly effective.

In other words, the "recommended variant" effectively makes the input and output unknown to the attacker by prepending and appending what are, in effect, random ciphers. As a result, the attackers expectations, based on the original cipher, are not met, and the normal statistical approach to an adaptive chosen plaintext attack is foiled. It would be necessary for the attacker to crack:
A) the initial random cipher;
B) the cloaked cipher; and
C) the final random cipher.

However, none of these can be cracked in isolation; i.e. either A) and B) must be cracked together, or B) and C). This makes the combinatorics of the attack very daunting, if not outright infeasible, for the attacker.

We do not know how complex an attack on this variant is, since we have not yet found an effective way to attack it. The difficulty of cracking the individual encodings suggests that it will have a high complexity.

The weakest point would seem to be the block-encoded wide-input LTs. However, it is not merely a matter of finding weak 4×4 blocks (ones where an output's entropy is reduced to three bits, say, where there are only 38,976 possible non-linear encodings). The first problem is that the output will often depend on multiple such blocks, which will then require some power of 38,976 tries. Of course, as previously noted, we may guess part of such encodings.

However, we must still deal with the second, and much more difficult, problem, which is: once the attacker has a guess at a set of encodings, partial or otherwise, for certain SBs, how can it be verified? Unless there is some way to verify a guess, such an attack cannot be effective.

6.0 How Useful is it?

It may not be immediately clear that the recommended variant (see section 5.4) of our white-box DES implementation, or white-box implementations of other ciphers using the recommended variant, can be useful. We consider here how such implementations can be made to do useful work.

6.1 Handling Plain Input or Output

Although we noted that the recommended variant employed an encoded intext and outtext, we can, in fact, employ an unencoded intext or outtext. After all, we are computing an invertible function; adding further bijections as pre- or post-whitening will not change this fact, and the result is that we are computing a cipher which embeds DES, rather than DES itself.

As a result, any obvious kind of statistical "bucketing" attack based on properties of DES is foiled.

The price we pay (other than the current slowness and size of white-box implementations) is that we are no longer using a standard encryption algorithm. However, it seems reasonably likely to be as strong as the original algorithm under black-box attack, and is certain to be much stronger under white-box attack.

6.2 White-Box Transaction Processing

From the description herein, it is straightforward to add some decision capability and flow-control and, indeed, to produce a Turing-complete set of operations (i.e. an operation set whose elements can be combined to compute anything which is computable), which nevertheless can be implemented in an input-output encoded fashion similar to our SBs. (The building blocks might be SBs, and networks of SBs, with added interpretive behavioural capabilities.) We can use this to perform file-updates and the like, in such a fashion that we decrypt encoded data to encoded, but usable, form, modify the information, encrypt it to encrypted and encoded form, and store it again.

So long as only small amounts of information enter or leave a transaction in plain form at unsecured sites, and almost all of the information transferred is encoded and encrypted for storage and at least encoded for update at unsecured sites, we can then perform file updates and transaction processing using white-box cryptography in such a fashion that nothing substantial ever leaves the encoded world, although some data at times is not in the encrypted world, except at secured sites. Any substantial decrypting and decoding of information can then be reserved for sites which are very well controlled.

This provides a means whereby software can be protected against insider attacks, particularly at sites which cannot otherwise be well protected by their owners. For example, if we fear military or industrial espionage, transaction processing as sketched above might be a significant help in managing that risk.

6.3 White-Box "Whitening"

It is sometimes recommended to use "pre- and post whitening" in encryption or decryption, as in DESX (for a description, see: *Applied Cryptography*, Bruce Schneier, 1996, 2nd ed., pp. 265-301, John Wiley and Sons, New York). We note that the recommended variant of the invention per section 5.2.4 computes some cipher, based on the cipher from which it was derived, but the variant is quite an non-obvious one. In effect, it can serve as a form of "super pre- and post-whitening".

In effect, it allows us to derive innumerable new ciphers from a base cipher. All attacks on cryptography depend on some notion of the search space of functions which the cipher might compute. The white-box approach increases the search space, generally by a significant amount.

6.4 White-Box Asymmetry and Water-Mark

The effect of using the recommended variant is to convert a symmetric cipher into a one-way engine: possession of the means to encrypt in no way implies the capability to decrypt, and vice versa.

This means that we can give out very specific communication capabilities to control communication patterns by giving out specific encryption and decryption engines to particular parties. By using double encryption or decryption based on a pass phrase, we can arrange that changing the communication patterns requires both a communicated pass phrase and a communicated encryption or decryption engine. And of course, every such engine is effectively water-marked by the function it computes.

It is also possible to identify a piece of information by the fact that a particular decryption engine decrypts it to a known form. There are many variations on this theme.

7.0 Logical Extensions

Many improvements, as well as extensions to other kinds of cryptographic computations, follow logically from the teachings herein. For example, there are clearly improvements that can be made in applying this work to RSA-like computations.

For DES-like ciphers, the blocking technique in section 4.1, while general, is of $O(m_\#^2 n_\#)$ complexity for a fixed bound on SB size. It is clear that other network topologies have potential to improve on the techniques described herein, such as shuffle-exchange topologies (especially irregular ones, for security). Where m=n, for example, these have the potential to reduce the spatial complexity for representing LTs to $O(m_\# \log n_\#)$ for a fixed bound on SB size.

The methods of the invention can also be combined with general methods of tamper-proofing software or applied to software other than cryptographic computation software.

Additional Observations on the General Invention

This section contains comments on the techniques described above regarding white-box cryptography, and alternative approaches.

8.0 Potential Avenues of Attack on Obfuscated DES Implementations

The following properties of the hidden-key DES implementation described in the co-pending patent application filed under the Patent Cooperation Treaty (PCT), as serial number PCT/CA00/00677, titled: "Tamper Resistant Software Encoding", are potential avenues for attack:

A) connectivity of the T-boxes, in the SIMPLE case (smooth input and output) completely identifies a T-box with a column in a specific S-box;

B) in the ORDINARY case (rough input and output), connectivity still identifies which T-boxes belong to the same S-box, leaving only the problem of identifying the S-boxes;

C) without the random Boolean functions, every output of every S-box in every round appears as a T-box output in either its original form or inverted form;

D) with the random Boolean functions, a sometimes linear, and always simple, Boolean function of 2 or 3 inputs relates bits emitted by T-boxes to original bits. For 2-input Boolean functions, there are only 10 functions which can be used, for example, given inputs A and B, you would have: A AND B, A OR B, (NOT A) AND B, etc. For 3-input Boolean functions there are only 100 functions which can be used.

So it seems clear that cracking the implementation with 3-input random Boolean functions will be well below the expected effort for brute-force discovery of a DES key;

E) the random Boolean functions partition information in a T-box. An information partition is easier to crack than a functional composition; that is, we should be moving the other way, to include compositions of functions in the implementation; and F) the entangling and detangling functions for the ORDINARY case are restricted to a tiny subset of the 64-bit to 64-bit linear Boolean functions. In the above PCT patent applications, we permute and flip the bits only.

Therefore, if we write a Boolean function from 64 bits to 64 bits as $F(X)=AX+B$ where X is the input vector of 64 bits, F(X) is the output vector of 64 bits, and A is a 64×64 matrix of bits, then our subset comprises all of the linear functions in which A has exactly a single 1-bit in each row, and exactly a single 1-bit in each column. Clearly, there are vastly more non-singular (i.e. invertible) linear Boolean functions that are not expressible in this form than ones which are.

These avenues of attack can be mitigated by use of the techniques described in this patent application.

9.0 General Comments on Boolean Functions from m Inputs to n Outputs

9.1 Information Preservation

A function f is information preserving precisely if it is an injection (is 'one to one'); that is, $f(x)=f(y)$ implies that $x=y$. We are primarily interested in information preserving Boolean functions.

9.2 Linear Boolean Functions from m Inputs to n Outputs

To define a concept of linearity, we need to embed Boolean vectors in a vector space. To make a vector space possible, we need a Boolean field. As described in more general terms above, we use the field $F_2=<Z_2, +, *>$ where $Z_2$ is the integers modulo 2 (that is, the set $\{0, 1\}$), + is integer addition modulo 2, (which has the same effect as Boolean XOR), and * is integer multiplication (which has the same effect as Boolean AND).

We define a vector space $V_n(F)$ over a field F to have elements in $F^n$ (denoting the order-n Cartesian product of F with itself). We define the product of multiplication of a vector by a scalar as the vector in which each new element is the product of the original element and the scalar in $F_2$. We define vector addition as element-wise addition of corresponding elements.

A linear n-to-n Boolean function F is information preserving if, when F is defined by $Y=F(X)=AX+B$ as described above, A's determinant is nonzero. Since we are in $F_2$, that means that its determinant must be 1.

There are $2^{(n^2+n)}$ linear n-to-n Boolean functions, since there are $n^2$ slots in A and n slots in B to fill independently with either 0 or 1.

For the case of an m-to-n Boolean function f defined by $F(X)=AX+B$, F is one-to-one if and only if n is not less than m, and the set of m columns of A, as a set of Boolean vectors, is the basis of a vector space of dimension m (that is, if the columns as Boolean vectors are linearly independent).

9.2.1 Counting Linear Functions

As noted above, there are $2^{mn+n}$ linear functions with m inputs and n outputs. For the case of m=n, where no information is lost, there are therefore $2^{n(n+1)}$ linear functions and there are $$\prod_{i=0}^{n-1}(2^n-2^i)$$

non-singular n×n matrices over $F_2$.

However, a linear function also includes a displacement vector; for each of the above matrices, we can choose any of $2^n$ displacement vectors. Hence, the total number of n×n linear bijections (that is, linear permutations) is $$2^n\prod_{i=0}^{n-1}(2^n-2^i).$$

For example, the number of 2×2 linear permutations is:

$$2^2(2^2-2^0)(2^2-2^1)=4\times3\times2=24$$

Since there are only 24 permutations of the numbers 0 . . . 3 in total, all 2×2 permutations are linear.

An n×n linear function in $F_2$ is singular if and only if, of the n column vectors (or equivalently, of the n row vectors) of its matrix, either at least one is zero, or a subset of the nonzero vectors yield a zero vector when its members are all added together. That is, either there is a zero vector, or there is a subset S of the vectors such that each member is nonzero and each vector bit position is 1 in an even number of the members of S. (For example, the vectors <0, 1, 1>, <1, 0, 1>, and <1, 1, 0> form a linearly dependent set since their sum is <0, 0, 0>.)

To restate the above, an n×n linear function is singular in $F_2$ if and only if there is a non-empty subset S, not necessarily proper, of the column vectors, such that each bit position is 1 in an even number of the members of S.

If a set S of vectors is linearly dependent, then any set of vectors which contains S is also linearly dependent.

9.3 General Boolean Functions from m Inputs to n Outputs

If we consider unrestricted Boolean functions from m inputs to n outputs, there are $2^{(2^m n)}$ of them. (There are $2^m$ possible input vectors. Corresponding to each, there is a vector of n elements. That gives a total of $2^m$ n slots to fill independently with either 0 or 1. Any difference in any bit produces a different function, so there are $2^{(2^m n)}$ functions.)

Such a function can only be information-preserving (an injection, one-to-one) if n is greater than or equal to m.

9.4 Permutations

If we restrict our attention to cases of n-to-n Boolean functions, of the $2^{(2^n n)}$ of them, $(2^n)!$ are permutations of the set of all Boolean vectors of length n (that is, in effect, of the numbers from 0 to $2^n-1$). All permutations are information-preserving (indeed, any injection, and hence, bijection, from a totally ordered set to itself can always be viewed as a 'permutation', and is commonly so called in cryptology), but not all are nonlinear. For example, neither the identity permutation, nor the permutation which inverts every input bit, are nonlinear. In the former, for $F(X)=AX+B$, A is the identity matrix and B is all zeros. In the latter, A is the identity matrix and B is all ones.

If we consider 2-to-2 Boolean functions, $(2^2)!=24$ of them are permutations. All of the permutations are linear, which can be seen as follows:

In $F(X)=AX+B$ form, there are six non-singular choices for A. For each of these, there are four possible choices for B, so 6*4=24. Plainly, for each choice of B, the effect of B is to perform a permutation, since it at most flips a bit position. Hence, for AX+B to yield a permutation of X, it is sufficient for AX to yield a permutation of X, but the fact that A yields a 1-to-1 function guarantees that it is a permutation. It follows that the 24 permutations of all Boolean vectors of length 2 are identical to the 24 2-to-2 linear bijections in $F_2$.

If we consider 3-to-3 Boolean functions, $(2^3)!=40,320$ of them are permutations of the numbers from 0 to 7. However, there are only:

$$2^{(3^2+3)}=2^{12}=4,096$$

linear 3-to-3 Boolean functions in total (ignoring information preservation). It follows that most of the permutations of all possible Boolean vectors of length 3 are nonlinear.

The number of linear 3×3 Boolean functions which are permutations is:

$$2^3(2^3-2^0)(2^3-2^1)(b^3-2^2) = 8 \times 7 \times 6 \times 4 = 1,344.$$

The exact number of non-linear 3×3 Boolean permutations is therefore:

40,320 permutations−1,344 linear permutations =38,976.

A choice among them therefore contains about 15.25 bits of entropy. "Bits of entropy" are bits of arbitrary or randomly chosen information. Wherever a given string can have K distinct equiprobable values, then we find the number of bits of information, or entropy, in K, by solving the equation $2^b = K$ for b, i.e. $b = (\log K)/(\log 2)$. In other words, b is the number of bits needed to encode K distinct choices. Referring to the above example, $b = (\log 38,976)/(\log 2) \approx 15.25$.

10.0 Adding Extra Non-Linearity to Functions Such as DES

To reduce the added entropy and hence, the size of the subnetworks which provide it, we should favour permutations of 3-bit non-contiguous bit-groups. Each represents a number from 0 to 7, so there are 8 elements and 8!=40,320 possible permutations. However, 3 does not necessarily evenly divide the number of bits for which we need a nonlinear unary operator.

10.1 Building Wider Permutations from Narrower Ones

If we take the 48 bits coming out of the XOR 54 with the round subkey (see FIGS. 4 and 9), then it divides into 16 groups of 3.

Figure 11:
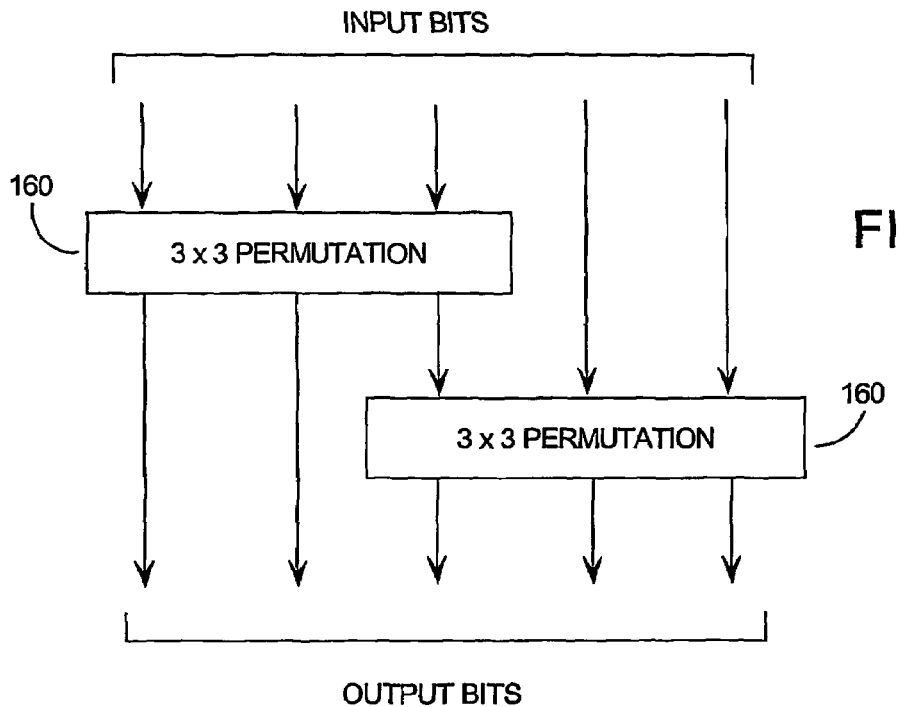
FIG. 11 presents a data flow diagram of a technique for effecting a 5-bit permutation using only 3-bit permutation modules, in an embodiment of the invention.

However, if we take the 32 bits coming out of a round (see the output of XOR 56 in FIG. 4), we need to have one permutation of 5 and 9 permutations of 3. To do this, we can proceed as shown in the block diagram of FIG. 11, where each 'wire' represents one bit of a number, so we can perform a 5×5 permutation using two 3×3 permutation transformations 160. Because we are using separate 3×3 permutations rather than a single 32 bit permutation, clearly this gives us only a tiny fraction of the 32! possible permutations.

In the above, we have 1-bit overlap to produce a 5×5 permutation. Using an overlap of 2 bits as shown in the block diagram of FIG. 12, we could similarly produce a 4×4 permutation using 3×3 permutations 160.

In the case of the 5×5 permutation produced as above, if we restrict each 3×3 sub-permutation to be non-linear, we have $38,976^2/2 = 759,564,288$ of them. (There are 38,976 choices for each, but there are 2 ways to map two things onto two things for the input bit in the 2nd which is from the 1st.)

This gives about 29.50 bits of entropy for a choice among them.

If, instead, we were to use a non-linear 5×5 permutation directly, then we have $32! = 2.631 \times 10^{35}$ permutations in all. Of these, the number of linear permutations is:

$$2^5(2^5-2^0)(2^5-2^1)(2^5-2^2)(2^5-2^3)(2^5-2^4) = 32 \times 31 \times 30 \times 28 \times 24 \times 16 = 319,979,520 = 3.199 \times 10^8$$

Hence, the linear permutations are a very small fraction of the total, $3.199 \times 10^8$ of $2.631 \times 10^{35}$ permutations.

A choice among the non-linear 5×5 permutations therefore contains about 117.66 bits of entropy, so using the above construction loses about 88.16 bits of entropy, but saves storage space. (Of course, we can apply this same technique with higher numbers; e.g., building a 7×7 permutation from two 4×4 permutations.)

Figure 12:
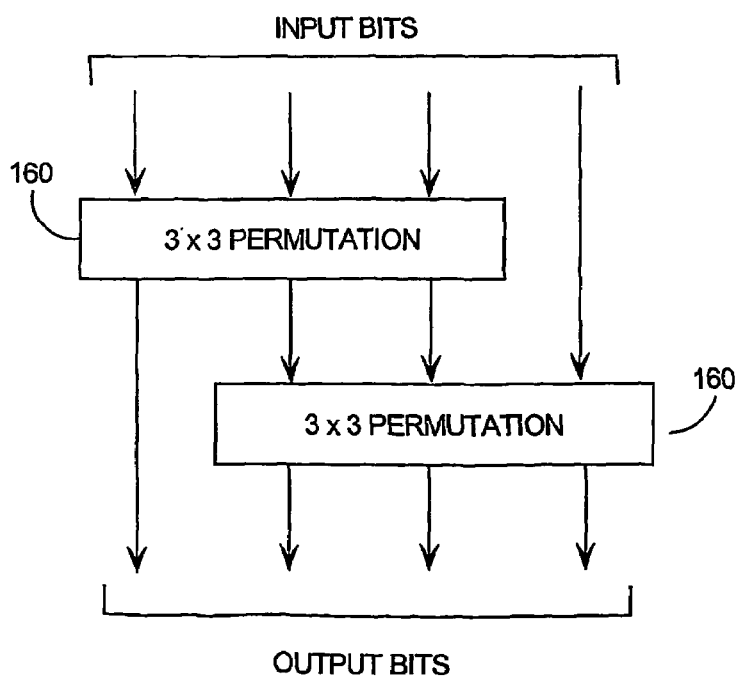
FIG. 12 presents a data flow diagram of a technique for effecting a 4-bit permutation using only 3-bit permutation modules, in an embodiment of the invention.

Similarly, if we use the overlapping of FIG. 12, there are $38,976^2/24 = 63,297,024$ permutations. There are 38,976 choices for each, but there are 24 ways to map four things onto four things for the input bits (representing numbers 0 . . . 3) output from the 1st and input by the 2nd. This gives us about 25.92 bits of entropy.

If, instead, we were to use a non-linear 4×4 permutation directly, then we have $16! = 2.092 \times 10^{13}$ permutations in all. Of these, the number of linear permutations is:

$$2^4(2^4-2^0)(2^4-2^1)(2^4-2^2)(2^4-2^3) = 16 \times 15 \times 14 \times 12 \times 8 = 322,560.$$

Again, the linear permutations are a very small fraction of the total.

A choice among the non-linear 4×4 permutations thus contains about 44.25 bits of entropy. So the construction loses about 18.33 bits of entropy, but takes less storage space.

Then to do 64 bits, we use twenty 3×3 permutations and one 4×4. To do 32 bits, we do nine 3×3 permutations and one 5×5 permutation.

The idea is to slice DES so that we have graph cuts at which we compute a function from M bits to N bits. The most obvious case of this is a round pair, which computes a function from 64 bits to 64 bits.

(Each round of DES simply copies the right 32-bit half of its 64-bit input to the left 32-bit half of its 64-bit output, while placing a mixture of the left and right input halves in the right 32-bit half of its 64-bit output. Accordingly, to mix both halves, we have to perform two rounds; one round is insufficient. A "round pair" is typically an odd-numbered round followed by an even-numbered round: 1 and 2, or 5 and 6, or 11 and 12, or 15 and 16.)

We represent the k'th 64-bit slice $S_k$ bit-vector by another 64 element bit-vector, $M_k(S_k)$. Where the old round-pair function was $F_k$, applied as in:

$$S_{k+1} = F_k(S_k)$$

the new round function is:

$$M_{k+1} \circ F_k \circ M_k^{-1}$$

where we seek to make the composition highly non-obvious and hard to unravel into the above compositional form.

10.2 Banyans and Other Switching-Based Networks for Mixing

Figure 13:
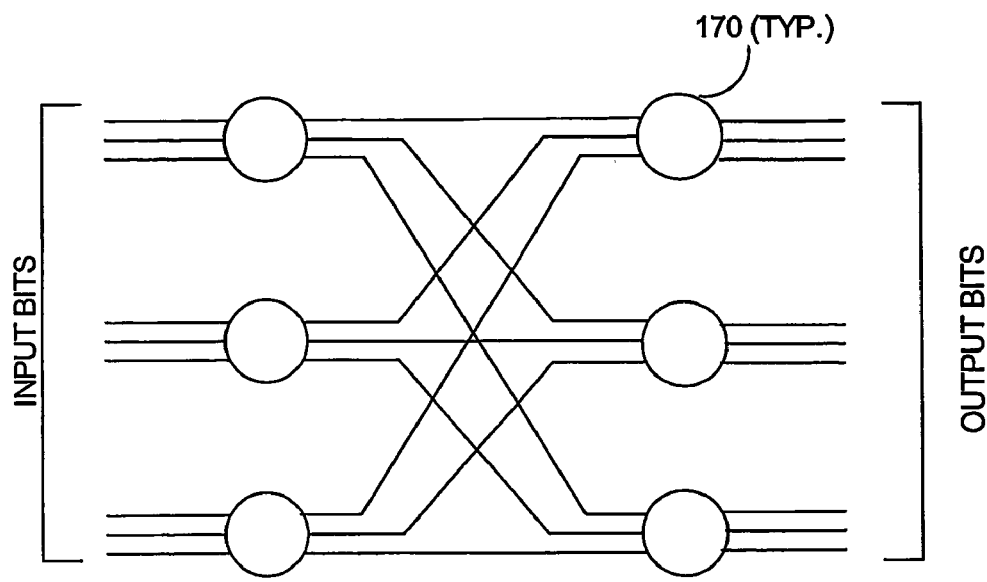
FIG. 13 presents a data flow diagram of an 9×9 Banyan Network for data mixing in an embodiment of the invention.

A Banyan network is a topology of nodes or switches in which there is a single path connecting each input to each output, and there are no internal circuits (or loops). FIG. 13, for example, presents a Banyan network having 9 inputs, 9 outputs and 6 nodes 170. This is described as a 9×9 (because there are 9 inputs and 9 outputs), base 3 Banyan network (base 3 because each node 170 or switch can route an input to any one of 3 outputs).

If the switches are replaced with mixing functions in which each output of each node 170 depends on all inputs, then the same topology can be used for white-box cryptography.

A $3^n \times 3^n$ base 3 Banyan network has $n \times 3^{(n-1)}$ nodes and mixes $3^n$ inputs so that every one of the $3^n$ outputs can depend on every input, given suitable choices of functions. That is, if n=2, then there are 6 nodes and the network is 9×9 as shown in FIG. 13. If n=3, then there are 3 layers of 9 nodes, for a total of 27 nodes, and the network is 27×27. If n=4, there are 4 layers of 27 nodes, for a total of 108 nodes, and the network is 81×81.

Note that such networks are invertible. Thus, the encoding performed by such a network can be undone simply by creating a mirror network with mirror elements containing functional inverses.

A base 3 Omega network has the same properties as detailed above for a base 3 Banyan network. However, a Banyan network addresses among nodes by repeatedly subdividing the network by the base (e.g., if there are 9 nodes, it first selects among the first third, second third, or third of the nodes, and then selects a third of the three nodes: one specific node).

An Omega network addresses differently. Number the input ports (where each node has a number of input ports specified by the base, and a number of output ports specified by the base) with a 2 digit base 3 number. Then each output port is connected to the succeeding input port found by rotating its number left, circularly, one position.

Other than their manner of interconnection, the networks have very similar properties.

The significance of these networks is that, where, for switching purposes, each node (for a base, b) is a b×b crossbar switch, for our purpose, each node is a function (which would usually be bijective) of the form E.

We can start with linear node-functions, and de-linearize them by the methods previously described in section 3. This is an alternative to the blocking method for representation, but restricts us to a subset of the linear functions which can be so represented.

The big advantage is the reduction in spatial complexity from $O(m_\#^2 n_\#)$ for a given blocking factor, to $O(m_\# \log n_\#)$: a huge savings in space. It also represents the same reduction in computational time, because a lookup must be done on each SB, and the huge reduction in the number of SBs therefore also represents a huge saving in execution time.

10.3 Compact m×n Nonlinear Boolean Functions

As noted above, memory capacity may be severely restricted and inflexible, as in the case of Smart Cards. Thus, techniques which optimise memory usage and still offer proper protection, are highly desirable.

Method I was already described above under section 4.1. Methods II and III proceed as follows:

10.3.1 Method II: Encoding of Bit-Position Permutation Functions Composed into a Bit-Position Permutation Network We can take a series of elements which take in n bits and output n bits, where each output bit is equal to one of the input bits: a bit-position permutation, such as a P-box in DES.

We can perform arbitrary permutations of bit-positions using elements such as 4×4, 3×3, or 2×2. However, encodings of 2×2 functions are all linear, so let us restrict our attention to those which are at least 3×3.

We can then encode the inputs and/or outputs so that the resulting functions are non-linear.

When an entropic repositioning is performed in this way, and can be expressed, before encoding, in this form, then if we use switching elements each of which permutes some relatively small number of bits (but 3 or more) bounded above, the space and time complexity of the encoded network is on the order of (n log n). This is much smaller than the quadratic order of the implementation of the same kind of function using Method I.

10.3.2 Method III: Encoding of Small Linear Functions Composed into a Network with Arbitrary Acyclic Connectivity This is a variant of the above, which includes all of the capabilities of Method II but increases the ability to handle compressing functions (m×n functions in which m is greater than n) and mixing functions where each output bit is to depend on many input bits.

In this variant, instead of small bit-position-permuting functions, we use small linear operations, possibly compressing ones (m×n where n<m) and we encode their inputs and outputs (thus making them nonlinear). For example, if we connect them into a Banyan network of the appropriate base, we still have an n×n function, but we can make every output dependent on every input in a network of space and time complexity of order (n log n).

The more we increase the depth of such a network, the greater the entropy added and the less restricted are the functions we can compute. Since we can encode an XOR in this fashion, we can therefore compute an arbitrary Boolean function using such a network. (XOR is a "complete" Boolean operator: any Boolean function can be computed by a direct acyclic graph containing only XOR nodes.) However, the size of network required (e.g., as prime implicants) varies on the order of ($2^m$ n).

Thus, in the worst case, there is no improvement in representational compactness compared to the full bit-tabulated representation, and on the contrary, there is an increase in overhead.

10.4 Mixing Entropy among Nodes in a Network of Boolean Functions: Domain Partitions Induced by Functions If we consider a function from m to n, where n≧2 and m>n, we have:

F: D→R where:

|D|=m; and

|R|=n;

then there is a partition $P=\{P_1, P_2, \ldots, P_n\}$, such that:

D is the union of the $P_i$'s;

the $P_i$'s are disjoint; and for each $P_i$, there is a unique element r of R such that $P^i = F^{-1}(\{r\})$. That is, each $P_i$ is the pre-image of a unique element r of R.

Let us call P the "domain partition of D induced by F".

If we are given D, R, and P, then there are exactly n! functions F such that F: D→R and the domain partition of D induced by F is P.

Now, it is plain that for any two such functions, say F and F', there exists a bijection:

B: R→R, such that:

F'=B∘F and

F=B$^{-1}$∘F'

Interesting and potentially useful situations arise where we can choose a B and F such that F is linear or can easily be constructed by simple non-linear functions on linear functions. This is because we know how to break a linear function down into a network which we can then non-linearize (see Method I in section 4.1 above, for example).

The use of this kind of breakdown of a function is: given a reference implementation, and a domain D which is of searchable size, we have some hope of duplicating the reference implementation, but in a fashion which distributes the entropy and functionality quite differently from the reference implementation.

For example, if we consider any 4 bits produced as an output of the P-box permutation in DES, it is the function of somewhere around 24 bits of input given a specific key and round. If we can implement this function by breakdown into a simple nonlinear function of linear components followed by a bijection, we can break it down into a network in which multiple partial S-box lookups have been smeared together. A particular way of doing this for S-boxes is presented in section 10.5.1.

Note that the above transform uses m>n. This is done because it is advantageous to change the number of input bits and output bits in a known construction, such as a DES S-box. If we do not, then irrespective of what bijective encodings we apply to the inputs and outputs, the attacker at least knows which sets of inputs produce exactly the same output. This can reduce the number of possibilities the attacker must consider, thereby speeding up the cracking process.

10.5 Moving Entropy with Full Data Dependency

10.5.1 The 'Red Path' Method

We often encounter the following sub-problem of the larger problem of cloaking cryptographic and other functions:

- we have a series of nodes with individually coded outputs;
- the outputs encode certain numbers of bits, so that the uncoded outputs separate the output information into specific bits;
- we have a series of nodes (possibly the same as the above nodes) with individually coded inputs;
- the original functionality required information to be moved in a bitwise basis, or at least in small lots, so that information from specific bits of information in the outputs arrive quite differently combined at the outputs; and
- we want to move information via some network from the previous outputs to the next inputs, such that the desired reconfiguration of the needed information occurs, but such that the attacker cannot determine how it moved.

Plainly, any approach to the above problem cannot simply narrowly move the information in small bundles, individually switched—it would then be possible to tell exactly where the information moved, which is giving away too much information. Ideally, we would like every output of the switching network to depend on every input of the switching network (where the switching network's job is to reconfigure the information according to a needed switching function).

What we want is a switching network with the following properties:

- necessary information enters the switch at pre-specified points in such a way that it is locally decodable at the switch inputs;
- necessary information is decodable with information locally available at the switch outputs; and
- notwithstanding the above, there is broad dependence of switch outputs on all switch inputs.

This results in a big switching network which sends lots of bits in many directions. Some of the inputs and outputs are relevant to the underlying computation, and some are there for the purpose of obfuscation. The paths from relevant input bits to relevant output bits are referred to herein as "red paths". All of the other paths are present, but irrelevant. That is, the non-red paths are the ones which are present for obfuscation and the red paths are the ones we actually need to do useful work.

Figure 14:
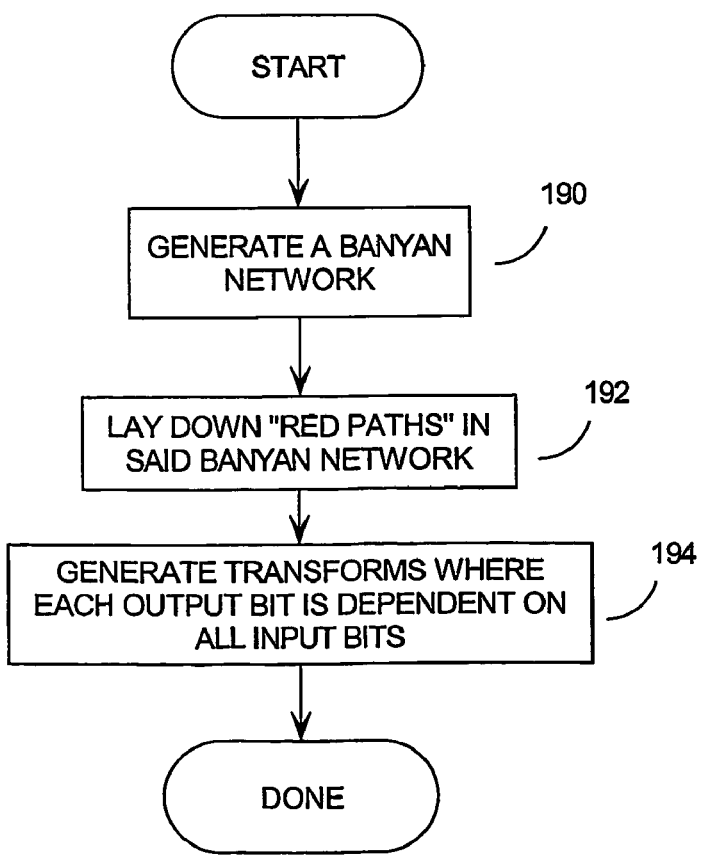
FIG. 14 presents a flow chart of a method of "red path" encoding in an embodiment of the invention.

The proposal on how to do this is presented briefly in the flow chart of FIG. 14. Firstly, a switching network is generated at step 190; say a sequence of K full Banyans for bundles of bits, where K is fairly small. Next, at step 192, the "red" paths are laid down on this switch network, which indicate the bundle path followed by the information to be switched. Finally, the boxes may be filled in at step 194, such that individual output bundles (or small groups thereof) encode desired output information, but the particular encoding of many used at a particular bundle is a data-dependent function of all of the switch inputs. In particular, in any node within the switch, every output bit should be dependent on every input bit. One should also verify full dependency over longer paths.

It would not be necessary to exactly use Banyans, but we do need full connectivity, probably multiple times.

Alternatively, one could lay down simple functions in the switch nodes (e.g., bitwise XOR). This would allow switching and computing to be encoded together.

10.5.2 The Big Bundle Proposal

Figure 15:
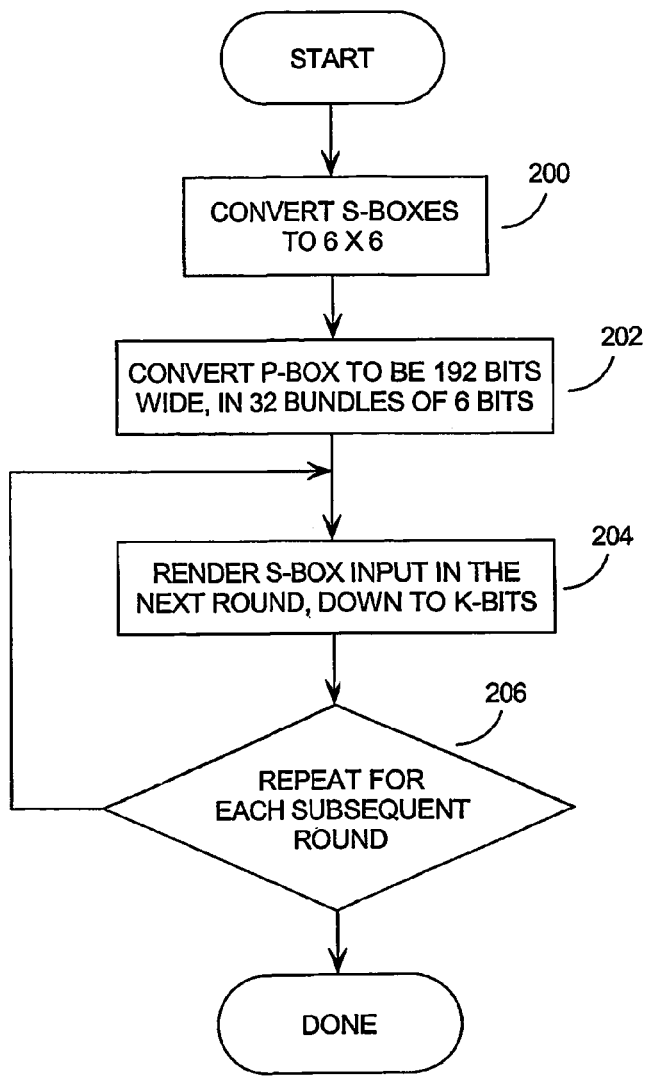
FIG. 15 presents a flow chart of a method of "big bundle encoding" in an embodiment of the invention.

Another approach to the protection of a standard DES algorithm is presented in the flow chart of FIG. 15. Implemented carefully, this technique can protect against some statistical bucketing attacks.

First, at step 200, the initial S-boxes 50 are convert from their 6 bit input, 4 bit output form, to 6×6, each modified S-box simply containing a permutation of 0 . . . 63.

Next, at step 202, the initial P-box 52 is converted to accommodate the 6×8 input bits from the S-boxes modified at step 200, and to provide an output 32×6=192 bits wide in 32 bundles of 6. In other words, the full 6 outputs of an S-box are used wherever one bit of the S-box would be required.

At step 204, the 36-bit S-box input in the 2nd round is rendered down to k bits, where k≧6. This step must be done such that any imbalances in the round-1 S-boxes are overcome; that is, trying to make the buckets equiprobable. This step is then repeated for each subsequent round of the DES algorithm, per step 206.

This technique does not hide the identity of the S-boxes 50, but only hides the key. If we can preserve the secret of the interior coding, then this technique may be effective.

However, if k>6, then a bucketing attack can identify the input values representing the same value. To prevent attack on the bucketing of the outputs of the S-boxes, we must make the implementation balanced. That is, we cannot divide codings into S-box output buckets evenly. We should arrange the buckets so that the imbalance of the S-boxes cannot be used to mount an attack.

This should also be done with consideration for avoiding the leakage of information due to the relationship among the S-boxes at each round, or among rounds.

11.0 The Information Reconfiguration Problem

An important recurring problem in implementing m×n Boolean functions by networks is the information reconfiguration problem, which is the problem of how to reconfigure the distribution of entropy between the inputs and outputs of a function, or its realization by a network, while preserving an acceptable level of security in the data encodings employed.

11.1 The DES P-Box Example

Exemplary instances of the information reconfiguration problem are the implementation of the Expansion permutation QPMd 46 or P-box permutation 52 in DES.

Figure 16:
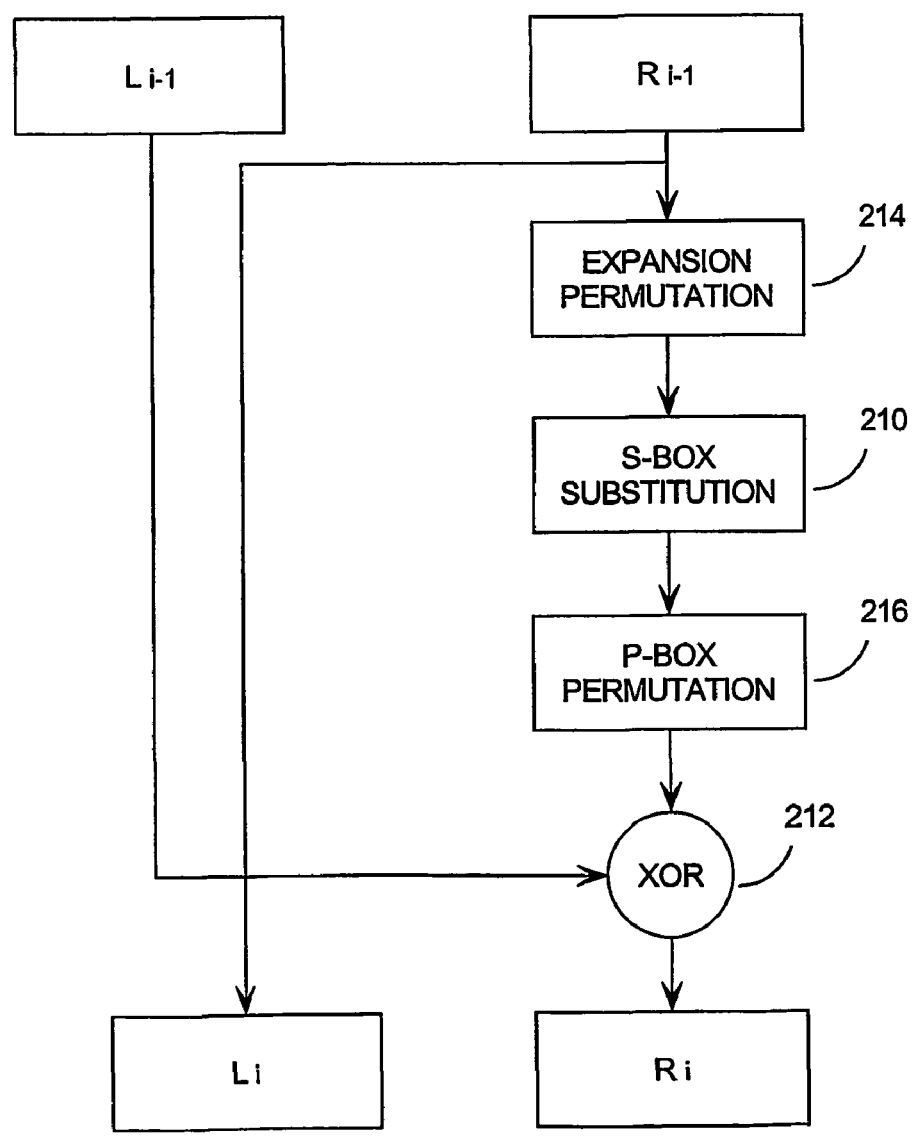
FIG. 16 presents a data flow diagram of a technique for addressing the information configuration problem, in an embodiment of the invention.

If we partially evaluate the S-boxes 50 with respect to the key, then a DES round may be presented per the block diagram of FIG. 16.

It is fairly easy to protect the functions represented by the S-box substitution step 210 and the XOR step 212.

For example, for the XOR 212, if we use 8×4 substitution boxes, where four of the eight inputs come from the left side and four from the right, so that we have, in effect, two 4-bit inputs and one 4-bit output, and if we encode the 4-bit inputs and the output independently using bijective mappings, then there are $(16!)^3$ distinct implementations of an encoded XOR function, the vast majority of which are non-linear. It seems unlikely that an efficient attack can be mounted at the XOR substitution boxes.

Then if, for the S-boxes 210, we use 6×6 boxes, each providing a bijection, where there is a 6×6 bijective encoding of the input, and a 6×4 decoding for the output, then each S-box 210 is unconditionally secure by itself, since each S-box table is a permutation of the numbers 0 . . . 63 and by manipulating either the input or output encodings we can produce any arbitrary permutation in the table.

This leaves the problem of modifying the expansion permutation 214 and the P-box permutation 216 so that the values actually traversing the transformed network do not reveal the underlying values which they represent. This is a more complex problem and is addressed in section 11.2.

11.2 Sample Application: DES

Figure 17:
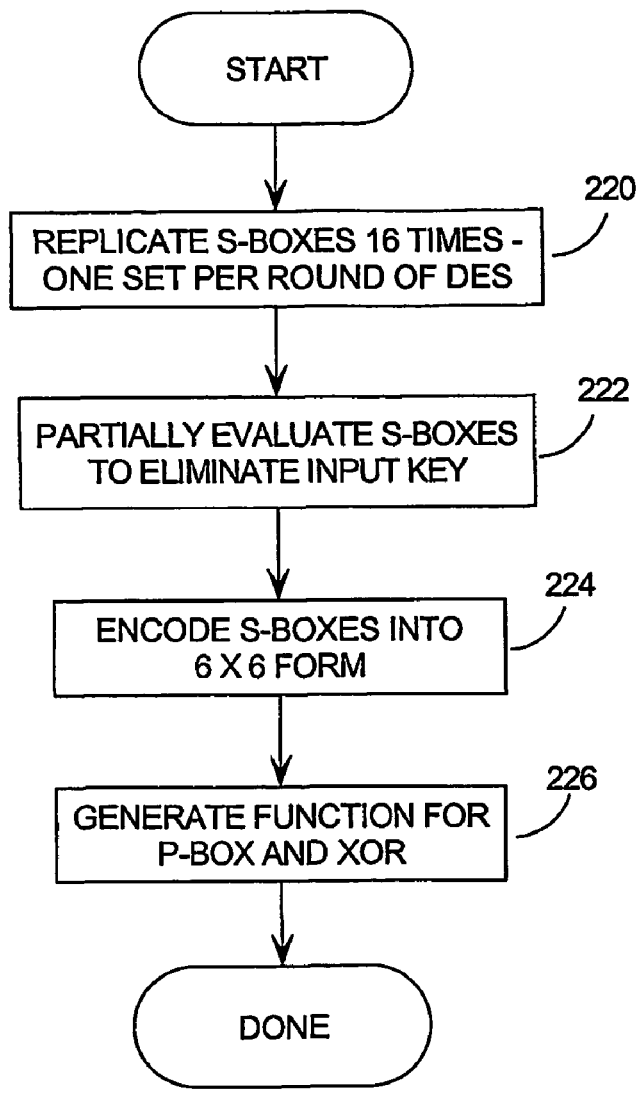
FIG. 17 presents a flow chart of a method of addressing the information configuration problem, in an embodiment of the invention.

Now, let us consider a specific DES example. Referring to the flow chart of FIG. 17:

First, we take all eight DES S-boxes 50 at step 220 and replicate each S-box 50 sixteen times so that we have a complete set of eight S-boxes for each round of DES. Then for each round, we partially evaluate at step 222, so that the key information is eliminated by changing the contents of the S-boxes 50.

We make no attempt to disguise the inputs of the 1st round of S-boxes 50. However, we encode the outputs as 6-bit values, rather than the 4-bit outputs of the original S-boxes 50. We can do this so that the contents of each round 1 S-box contains a table which is simply some permutation of the numbers from 0 to 63 (because $2^6$=64). Hence, the S-boxes 50 are "unconditionally secure" with respect to the key bits folded into them. Note that the output bits contain all of the entropy of the input bits.

To make this happen, we preferably encode S-boxes 50 at step 224 as follows: we first create a 6×6 S-box by making the low-order 4 bits of output the same as the unencoded outputs, and prepending the two row selection bits. Since each row is a permutation of the integers from 0 to 15, and hence, encodes a 4×4 bit-vector bijection, this guarantees that no entropy is lost. We then encode the resulting 6 bits arbitrarily using an arbitrary non-linear permutation of 0 . . . 63, and fill the table accordingly.

To get to the next round, we need to do the following: to model the P-box permutation 52 followed by the bitwise XOR 56 with the left side, and emitting the new left side (a recoded version of the incoming right side and the new right side—the output of the bitwise XOR 56).

We note that the function taking us from one round to the next in the original implementation is an 80×80 bit-vector function. If we decode the 6×6 S-box outputs before input to this function, and code them again for the outputs, then what remains between the decode and the encode is a linear 80×80 function, since the XOR 56 is plainly linear, the P-box 52 is linear, and the composition of linear functions, or a concat combination of linear functions, are also linear.

A bit-wise XOR of two n-bit vectors is computed by a matrix of n rows and 2n columns where we multiply the matrix by the concatenation of the two input vectors, and the result is the output vector. The k'th row of the matrix has (k−1) binary 0s followed by a 1, followed by n binary 0s followed by a 1, followed by (n−k−1) binary 0s. In general, for permutations of the inputs and outputs, the matrix would have linearly independent rows in which each row contained only two 1's and each column contained only a single 1.

12. Reconfiguring Substitution Boxes 12.1 Combining S-Boxes in DES

S-boxes 50 in DES can be arranged into a ring, in which each S-box 50 shares two (pre-expansion permutation) inputs with its neighbour to the left in the ring, and two (pre-expansion permutation) inputs with its neighbour to the right in the ring.

Hence, any pair of neighbouring S-boxes 50 can be combined into a single new S-box which has ten inputs and eight outputs. The size of such an S-box is 1K bytes, but we only need 4 of the new S-boxes per round, so 4K bytes provides all of the S-boxes needed for one round.

If we output a mixing linear map of the output, we can still do the XOR and get to the next round via a single 64-input M-box (see FIG. 10 and section 5.4).

12.1.1 Summary of DES S-Box Hiding

The work on hiding S-Box lookups and DES in general can be summarized with the following key observations:

A) we can split a T-Box lookup into 2 pieces (note that we are going to end up with T-Boxes that are far more complex than those described in the co-pending patent application serial number PCT/CA00/00677, referred to above):
  i) 5 bits into 2 bits (basically, the two possible output bits for the two different choices of the 6th bit); and
  ii) 2 bits from above and 1 original bit to produce T-box result (basically, the new bit chooses one of the bits from step a.
We could also:
  i) share 2 bits between the next 2 steps;
  ii) 1new+2 bits into 1 bit;
  iii) 1new+2 bits into 1 bit (where the 1 is different); and
  iv) combine the result of ii) and iii) together to form result.
This could also be done with more than 2 bits out from steps ii) and iii).
B) S-Box inputs overlap in that two neighbouring S-Boxes will share exactly 2 inputs. This means we can use an 8-input table that will have 5 inputs each for a pair of neighbours.

After unravelling the permutation:

| | | | | | | | | | |
|---|---|---|---|---|---|---|---|---|---|
| S1 has inputs | 3 | 4 | 5 | 6 | 7 | 8 | | | |
| S2 has inputs | | | | | 7 | 8 | 9 | 10 | 11 | 12 |
| S3 has inputs | | | | | | | | 11 | 12 | 13 | 14 | 15 | 16 | i) the simple way is to have a ring of 8 S-boxes, each S-box computes four partial results, two for each of the neighbours. We can arbitrarily choose which two from each S-box, evaluating the partial results later.

That is:

| | | | | | | | | | | | |
|---|---|---|---|---|---|---|---|---|---|---|---|
| S12' has | 4 | 5 | 6 | 7 | 8 | 9 | 10 | 11 | | | |
| S23' has | | | | | 8 | 9 | 10 | 11 | 12 | 13 | 14 | 15 |

Observe that S12' has 5 of the inputs for S1 (missing 3) and S2 (missing 12).

Each T-box output could be computed in two places, but we do not have much freedom to choose—we can partition the 4 outputs of an S-box to the two S-boxes, but that fixes the distribution for the whole ring. (Instead of 2, 2 we could do other distributions; but since we only get to choose once for the whole ring, it is not clear what we gain by security).

ii) the complex way to have a ring of 16 S-boxes is as follows:

|         |   |   |   |   |   |   |   |   |    |    |    |    |    |    |
|---------|---|---|---|---|---|---|---|---|----|----|----|----|----|----|
| S1' has | 2 | 3 | 4 | 5 | 6 | 7 | 8 | 9 |    |    |    |    |    |    |
| S12' has |   |   | 4 | 5 | 6 | 7 | 8 | 9 | 10 | 11 |    |    |    |    |
| S2' has |   |   |   |   | 6 | 7 | 8 | 9 | 10 | 11 | 12 | 13 |    |    |
| S23' has |   |   |   |   |   |   | 8 | 9 | 10 | 11 | 12 | 13 | 14 | 15 |

This has the property that each T-box output can be computed in three different places and we have a lot of freedom to decide where each T-box is actually computed. On average, we could compute each T-box in 2 parts, to be combined later.

Note that this wiring pattern is dictated by S12' having 5 inputs for each of S1 and S2;

C) any function in general (and S-box in particular) can be split into multiple paths. For example, a T-box can be split into 2 paths by defining T1 to be random, and T2 to be T XOR T1;

D) S-box output can have codings that are dependent on other bits. We merely need to bring together the necessary bits to interpret. For example:
  i) in the case of S1, the output is already depending on bits 3-8, if we compute it in S1', we could code the output to be XOR bit 2;
  ii) we could chose the output of S1 to be split between S1' and S12'; and code the first part with bit 2, the second part with bit 11.

E) coding of a bit can be really complex. In the co-pending patent application filed under serial number PCT/CA00/00677, we described the use of bit-permutation and bit-flipping. The next step is to use functions like:

b2'=b1 XOR b2 and we can even do things like:

b1'=b2 if b4=0 b3 if b4=1

F) in the construction, there are lots of excess connections and computations, we should maximize the use of them as the "controllers" for dependent codings.

Thus, the plan as seen by attacker (using the B) ii) complex variant), is as follows:

A) everything is done by 8-input, 8-output boxes (call them T8 boxes);

B) from Smooth input: each of L and R goes through a network of T8 boxes and will end up as a group of bits in coding C1. C1 will probably expand from 32 bits to maybe 50 bits;

C) for each round, do the equivalent of E:
  take the R' bits (in C1), through a big T8-box network ending up in 16 bundles of 8 bits (in C2). This can be shared for all rounds;

D) per round S-box:
  16 S-boxes, each taking a bundle of 8 bits (in C2), each returning 8 bits (in C3). These S-boxes will have key bits embedded;

E) for each round, do the equivalent of P+XOR:
  take the L' bits (in C1) and the outputs of the S-boxes (in C3), go through a network to do the P-box and XOR, ending in the new R' bits in C1; and F) for each round:
  switch the new R' and L' (both in C1)

The codings used in this system are as follows:

C1 is the "nominal" representation across round boundary, and has two copies in L and R; so it can be attacked from several ways, but it is also has the least constraints in that each Rough bit could be a function of all Smooth bits.

C2 is basically 16 independent codings—one for each S-box input. The dependencies are confined to within each bundle (not strictly true—we could in fact carry over the missing dependencies to our output coding). Within a bundle, the mapping can be arbitrary.

If the bundles share some bits, it is probably better to produce multiple copies, one per bundle, so that they are coded independently.

C3 is basically 16 independent codings—one for each S-box output. The dependencies are confined to within each bundle (possibly inheriting missing dependencies, see C2). Within a bundle, the mapping cannot be arbitrary since we need to be able to route information to follow DES.

How to execute the entire method:

A) build the Smooth data-path in S-boxes:
  i) start with a ring of 16 S-boxes, the Smooth inputs are forced by observation B) ii);
  ii) assign Smooth outputs. For each Smooth output, assign place(s) in S-boxes. There are several choices:
    1) put the whole output into one of the three S-boxes that can compute it;
    2) split and put each part into a (possibly) different S-box. Note that we are somewhat constrained in that if we choose to split every single T, see observation B) i). It is probably best to randomly choose, with something like 75% chance of splitting, that gives us good flexibility in locally assigning T to S', and makes it harder for the attacker;
  iii) pad unused outputs. If there are any output slots left, assign a random (but real) T-box.

B) assign S-box codings:
  i) assign output coding:
    for each Smooth output, pick a coding. Preferably, the coding should depend on between 1 to 3 other bits (preferably, output bits of the S-box but could be input bits as well), taking care that we can decode back to Smooth bits.
  ii) assign input coding:
    for each Smooth output, pick a coding. See above for constraints.

C) build E' network:
  i) start with the output layer. Since we need to produce C2 (assuming we duplicate shared bits), we will need 16 T8-boxes. We will build layers towards the input until we end up at C1;
  ii) pick up C2 for each output bit, and drag in the bits necessary to decode;
  iii) count up the inputs we need for each T8-box, some will want more than others. Pad them out so that the numbers are not too different. It is probably useful to make sure every T8-box gets at least one extra input. Note selection of these extra inputs is interesting;
  iv) for each T8-box that has more than 8 inputs, insert intermediate T8-boxes, trying to minimize the depth (this is kind of like a 2-3 tree type problem). Remember to add some extra inputs; and v) connect the topmost layer inputs to the R' bits.

D) build P'+XOR network. This is done more or less the same way for E' except that we have mark out some place to do the XOR. Preferably, the XOR should happen at different levels for each bit.

12.2 Splitting Substitution Boxes

Another way to add confusion in an implementation involving substitution boxes is to split one substitution box into multiple boxes, such that none of the boxes created by the split has sufficient information to compute the original pre-split result, but the information from their combined outputs is sufficient to compute the original pre-split result, assuming that we know how their outputs are encoded.

12.2.1 Example: Splitting a DES S-Box

Every S-box, say box B, in the original DES implementation, or the DES implementation after S-boxes have been modified by folding the 6-bit portion of the round subkey relevant to that box, has inputs made up as follows:

A) 2 bits go to B alone;
B) 2 bits are shared with box A; and
C) 2 bits are shared with box C.

where A, B, and C are distinct S-boxes.

In the initial rounds, the path of the input bits clearly identifies the S-box, making it very easy to determine which box is which.

Let us ignore the sharing above and consider splitting one S-box in isolation, without worrying about shared connectivity.

We have a 6×4 S-box, S. Let us make an U-box, U, and a V-box, V, as follows: U and V are 6×4 substitution boxes. U takes three S-inputs and three inputs not from S. V takes three S-inputs and three inputs not from S. U and V do not share any input bits. We want to be able to determine the S-output vector from the U-output vector and the V-output vector.

We note that, given the value of the U inputs, there are then $2^3=8$ possible output values (not necessarily distinct) depending on the value of the three S-inputs which go to V but not U.

Hence, as a first approximation, for a given input vector, U can output:

$<R_0, R_1, \ldots, R_7>$ where: $R_i$ is the result expected if the value of the three missing inputs (attached to V rather than U) is i.

If we concatenate all of the R's, we have a 32-bit output.

For V, we can have V output the index i, a number in the range 0 . . . 7, used to index into the 32-bit output of U to select a particular 4-bit block within it. (This has the bad effect of producing one invariant V-output, which we do not want because it narrows the attacker's search space.)

Of course we would want to encode all of the inputs and outputs: the above situation would be a pre-encoding situation. However, even as a pre-encoding situation, it is not good, because U and V each have three "do not care" inputs: bad news. This kind of situation is highly detectable just by looking at the U-box and V-box tables. This gives away too much information narrowing down the attacker's search space.

Let us modify it: we have U output the concatenation of the elements of:

$<R_0, R_1, \ldots, R_7, E>$ that is:

$R_0 \| R_1 \| \ldots \| R_7 \| E$ (a 38-bit U-output vector) where the R's are as above, and E (for entropy) is simply the entire U-input vector. (We make E be the full U-input vector because we do not know whether the R-portion of the U-output is different for each distinct input vector. Hence, unless we make E the full six input bits, it may lose information.) Now U is non-lossy: there are no do not-care inputs. Moreover, full entropy is preserved across all outputs, even if it would not be preserved by S. Hence, no information can be deduced from the way entropy is lost: it is not lost.

In the same spirit, we have V output i∥j where i is the 3-bit value in the range 0 . . . 7 used to index into an R sub-string of the U-output vector, and j is the remaining three bits. As a result, V is likewise entropy-preserving.

| S1 has inputs | 3 | 4 | 5 | 6 | 7 | 8 | | | | | |
|---|---|---|---|---|---|---|---|---|---|---|---|
| S2 has inputs | | | | | 7 | 8 | 9 | 10 | 11 | 12 | |
| S3 has inputs | | | | | | | | | 11 | 12 | 13 | 14 | 15 | 16 |

Split as follows:

```
3 4 5 6 7 8
    7 8 9 10 11 12
            11 12 13 14 15 16
 |———A———|
       |———B———|
```

Thus, we can make an A-box with 8 inputs and 8 outputs, which narrows its left overlapping original box to one of two and the right overlapping original box to one of two possibilities. We know we can represent the A-output in 8 bits since only 8 bits went in.

We can also make a B-box with 8 inputs and 8 outputs, which narrows its left overlapping original box to one of two and the right overlapping original box to one of two possibilities. We know we can represent the B-output in 8 bits since only 8 bits went in.

We can use overlap, or avoid overlap. If we use overlap, note that we have four bits of overlap—enough to narrow down the alternatives to four.

Alternative overlap is:.

```
3 4 5 6 7 8
    7 8 9 10 11 12
            11 12 13 14 15 16
 |—A—|
    |———B———|
```

Now there are 5 bits of overlap between A and B, enough to narrow down the possibilities to two.

13. Concluding Remarks

While particular embodiments of the present invention have been shown and described, it is clear that changes and modifications may be made to such embodiments without departing from the true scope and spirit of the invention.

The techniques of the invention have been described with respect to the DES application, but clearly can be applied in many other contexts. The AES (Advanced Encryption Standard) approved under FIPS-197 would be a typical example. The linear (or "affine" to use the terms employed in the standard) transformations in AES including the S-box, ShiftRows and MixColumns transformations could all be obfuscated using the techniques of the invention. The AES is well known in the industry and information is available available. The FIPS standard for AES is available on the Internet at http://csrc.nist.gov/encryption/aes/ and exemplary software code is available at http://csrc.nist.gov/encryption/aes/rijndael/.

It is understood that as de-compiling and debugging tools become more and more powerful, the degree to which the techniques of the invention must be applied to ensure tamper protection, will also rise. As well, the concern for system resources may also be reduced over time as the cost and speed of computer execution and memory storage capacity continue to improve.

These improvements will also increase the attacker's ability to overcome the simpler tamper-resistance techniques included in the scope of the claims. It is understood, therefore, that the utility of some of the simpler encoding techniques that fall within the scope of the claims, may correspondingly decrease over time. That is, just as in the world of cryptography, increasing key-lengths become necessary over time in order to provide a given level of protection, so in the world of the instant invention, increasing complexity of encoding will become necessary to achieve a given level of protection.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory medium may be programmed to execute such method steps. Suitable memory media would include serial access formats such as magnetic tape, or random access formats such as floppy disks, hard drives, computer diskettes, CD-Roms, bubble memory, EEPROM, Random Access Memory (RAM), Read Only Memory (ROM) or similar computer software storage media known in the art. Furthermore, electronic signals representing these method steps may also be transmitted via a communication network.

It will be clear to one skilled in these arts that there are many practical embodiments of the DES implementation produced by the instant invention, whether in normal executable machine code, code for a virtual machine, or code for a special purpose interpreter. It would also be possible to directly embed the invention in a net-list for the production of a pure hardware implementation, that is, an ASIC.

It would also be clear to one skilled in the art that this invention need not be limited to the existing scope of computers and computer systems. Credit, debit, bank and Smart Cards could be encoded to apply the invention to their respective applications. An electronic commerce system in a manner of the invention could for example, be applied to parking meters, vending machines, pay telephones, inventory control or rental cars and using magnetic strips or electronic circuits to store the software and passwords. Again, such implementations would be clear to one skilled in the art, and do not take away from the invention.

What is claimed is:

1. A method of modifying a software algorithm to foil tracing and other static, dynamic, and statistical attacks comprising the steps of:
   (a) identifying a step in the software algorithm which comprises a simple function representable as a lookup table whereby the simple function is computable by a table lookup;
   (b) converting the simple function to a lookup table, whereby the lookup table, when indexed by an input to the simple function or by a bit-string concatenation of multiple inputs to the simple function, returns an element which is a corresponding output of the simple function or a bit-string concatenation of multiple outputs of the simple function;
   (c) replacing the lookup table by one of a new lookup table and a non-looping computation by computing the net final result of the functional composition of the identified simple function itself and one of, or both of, the following:
      (i) a randomly chosen, nonlinear bijection on the input or the concatenation of multiple inputs of the identified simple function, whereby each input is subjected to a single bijective encoding; and,
      (ii) a randomly chosen, nonlinear bijection on the output or the concatenation of multiple outputs of the identified simple function, whereby each output subjected to a single bijective encoding;
   whereby the new lookup table or non-looping computation employs input encoding (i), and/or output encoding (ii), and the original computation no longer exists as a lookup table or non-looping computation and instead, only a modified computation computing a related function employing encoded input(s) and/or encoded output(s) exists, the identified simple function thereby being modified; and,
   (d) adjusting a context of the modified simple function whereby the context comprises computer code providing input(s) to the simple function and accepting output(s) of the simple function, and the modified simple function is also modified to provide input(s) with the same encoding(s) as employed for input(s) in the input- and/or output-encoded lookup table or non-looping computation of (c) above, and/or to accept a output(s) with the same encoding(s) as employed for output(s) in the input- and/or output-encoded lookup table or non-looping computation of (c) above.

2. The method of claim 1 whereby the identifying of the simple function representable as a lookup table is repeated for multiple simple function within the software algorithm, and each of those identified simple functions is converted to encoded lookup tables or non-looping computations and processed according to steps (b), (c) and (d) of claim 1.

3. The method of claim 2 whereby a group of such simple functions are within the software algorithm prior to the modifying of the software algorithm, each such simple function having an input or an output, which is an output or an input, respectively, of another of the simple functions in the group, and for which the simple functions of the group are connected by means of the output of one being an input to another, the encodings of step (c) being chosen so that the conversion of each simple function of the group is constrained to produce choices for which the output encoding matches the corresponding input encoding.

4. The method of claim 3, further comprising the step of preserving input information in the outputs of the identified simple functions of the group by combining a step or component comprising one identified simple function and a copy operation comprising another identified simple function into one step or component, thereby producing a combined simple function performing the functionality of both the step or component and the copy, with the information thereby bypassing the step or component.

5. The method of claim 4, further comprising the step of employing two distinct encodings of the outputs of the combination whereby one such encoding interprets the combined step or component according to the original step or component; the other encoding interpreting the combined step or component as a copy operation, whereby copying and transformation are simultaneously achieved.

6. The method of claim 3 whereby the group of simple functions comprises a function expressible as a network of linear functions which are, by the random choices of input and output encodings of step (c) de-linearized.

7. The method of claim 6 whereby the network of linear functions performs the computation of a matrix-based function and components of the network comprise functions obtained by blocking the matrix into smaller submatrices.

8. The method of claim 7 whereby, in addition to encoding the simple functions individually, a group of simple functions comprising a network of linear functions derived from the matrix blocking are further protected by encoding the matrix prior to the matrix blocking, the matrix encoding performed by composing the matrix with a linear bijection matrix for input-vector encoding and/or a linear bijection matrix for output-vector encoding and converting it into a network of linear functions comprising a group of simple functions.

9. The method of claim 8 whereby the linear bijections which perform input- and/or output-vector encoding are employed for input and/or output whitening for a cipher.

10. The method of claim 3 whereby the input-output-connected group of simple functions computes a function which is further protected by a prior addition of a network of functions which processes the inputs and/or outputs of the network of functions to encode its inputs and/or outputs to cause the network of functions to have a topology that is a full M by N switching network in which a data path connects every one of the M inputs of the network of functions to every one of the N outputs of the network of functions.

11. The method of claim 3 whereby the software algorithm is first protected by partial evaluation with respect to some or all of its constant inputs or parameters, by diffusing the inputs or parameters into other parts of the software algorithm.

12. The method of claim 11 whereby one such constant input or parameter is a cryptographic key and the software algorithm comprises a cipher.

* * * * *